US008495162B2

(12) United States Patent  
Suzuki

(10) Patent No.: US 8,495,162 B2  
(45) Date of Patent: Jul. 23, 2013

(54) COMMUNICATION SYSTEM, COMMUNICATION APPARATUS AND COMMUNICATION METHOD OF COMMUNICATION SYSTEM

(75) Inventor: Noriyuki Suzuki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 663 days.

(21) Appl. No.: 12/145,173

(22) Filed: Jun. 24, 2008

(65) Prior Publication Data

US 2009/0019129 A1 Jan. 15, 2009

(30) Foreign Application Priority Data

Jul. 10, 2007 (JP) ................................. 2007-181324

(51) Int. Cl.
*G06F 15/16* (2006.01)
(52) U.S. Cl.
USPC ........................... 709/208; 370/458; 370/466
(58) Field of Classification Search
USPC .......................................................... 709/208
See application file for complete search history.

(56) References Cited

U.S. PATENT DOCUMENTS

| 4,271,505 | A | * | 6/1981 | Menot et al. .................. 370/400 |
| 4,969,093 | A | * | 11/1990 | Barker et al. ................. 718/102 |
| 5,675,811 | A | * | 10/1997 | Broedner et al. ............. 713/323 |
| 5,793,993 | A | * | 8/1998 | Broedner et al. ............. 710/106 |
| 5,805,817 | A | * | 9/1998 | Yu et al. ....................... 709/224 |
| 5,812,796 | A | * | 9/1998 | Broedner et al. ............. 710/302 |
| 6,587,968 | B1 | * | 7/2003 | Leyva ............................ 714/43 |
| 6,970,953 | B2 | * | 11/2005 | Gregory et al. ................ 710/15 |
| 7,054,916 | B2 | * | 5/2006 | Kitamura ...................... 709/217 |
| 7,228,363 | B1 | * | 6/2007 | Wehrle et al. .................. 710/10 |
| 7,312,628 | B2 | * | 12/2007 | Houston et al. ................ 326/30 |
| 7,330,766 | B2 | * | 2/2008 | Kuwayama et al. ............. 700/3 |
| 7,369,157 | B2 | * | 5/2008 | Kim .............................. 348/159 |
| 7,386,641 | B2 | * | 6/2008 | Xu et al. ........................ 710/19 |
| 7,526,526 | B2 | * | 4/2009 | Clemens et al. ............. 709/208 |
| 2002/0075890 | A1 | * | 6/2002 | Kim et al. ..................... 370/442 |

(Continued)

FOREIGN PATENT DOCUMENTS

JP 04-340827 A 11/1992
JP 09-097269 A 4/1997

(Continued)

OTHER PUBLICATIONS

Apr. 6, 2010 Chinese Office Action, that issued in Chinese Patent Application No. 200810130578.3.

(Continued)

*Primary Examiner* — Ashok Patel
*Assistant Examiner* — Andrew Goldberg
(74) *Attorney, Agent, or Firm* — Cowan, Liebowitz & Latman, P.C.

(57) ABSTRACT

A communication system in which a plurality of communication apparatuses and a communication control apparatus are daisy chained. The communication control apparatus transmits control data to the plurality of communication apparatuses, and receives data transmitted by the plurality of communication apparatuses. Each communication apparatus receives data from another communication apparatus on a different side from a communication control apparatus side, in synchronous with receipt of the control data, and transmits data to one of the communication control apparatus and another communication apparatus on the communication control apparatus side, and following the transmission, to transmit data received to the one of the communication control apparatus and the other communication apparatus on the communication control apparatus side, in synchronous with receipt of the control data.

9 Claims, 28 Drawing Sheets

U.S. PATENT DOCUMENTS

| | | | |
|---|---|---|---|
| 2003/0128007 A1* | 7/2003 | Fujisaki et al. | 318/560 |
| 2003/0174724 A1* | 9/2003 | Olson et al. | 370/420 |
| 2006/0083259 A1* | 4/2006 | Metcalf et al. | 370/458 |
| 2006/0136624 A1* | 6/2006 | Takano | 710/62 |
| 2007/0086475 A1* | 4/2007 | Clemens et al. | 370/458 |
| 2007/0242062 A1* | 10/2007 | Guo et al. | 345/204 |
| 2009/0102978 A1 | 4/2009 | Ota | |

FOREIGN PATENT DOCUMENTS

| | | |
|---|---|---|
| JP | 11-245817 A | 9/1999 |
| JP | 2000-324535 A | 11/2000 |
| JP | 2003-069985 | 3/2003 |
| JP | 2004-179784 | 6/2004 |
| WO | 2007/040251 A | 4/2007 |

OTHER PUBLICATIONS

Oct. 9, 2012 Japanese Office Action, that issued in Japanese Patent Application No. 2007-181324.

Jul. 10, 2012 Japanese Office Action, that issued in Japanese Patent Application No. 2007-181324.

* cited by examiner

F I G. 4A
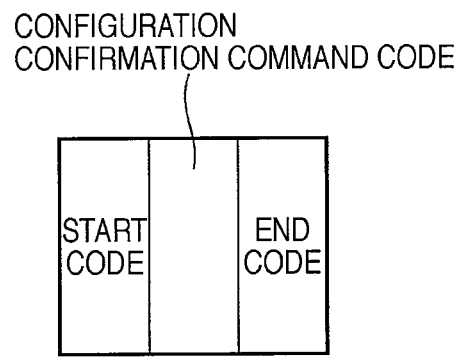
F I G. 4B
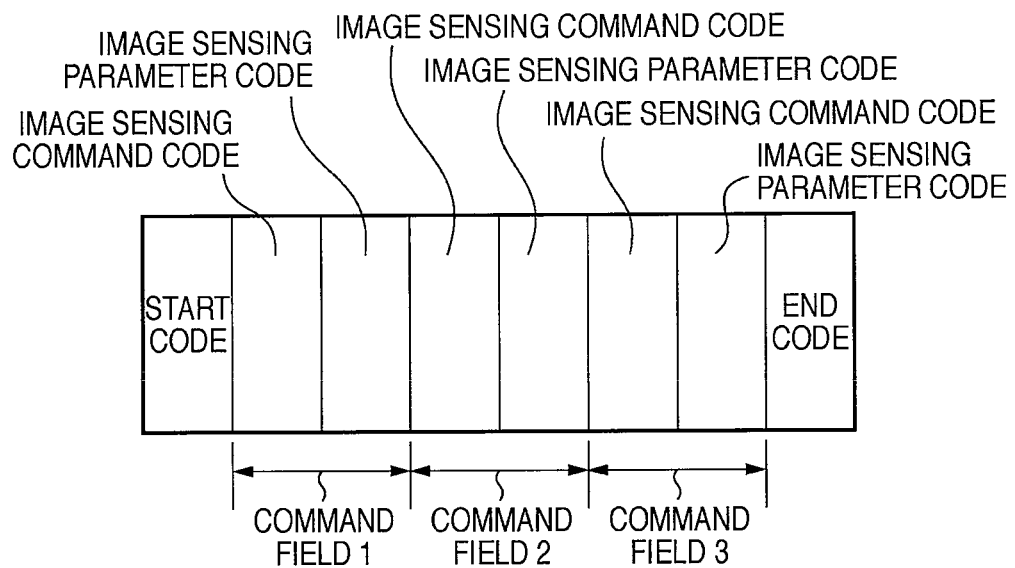

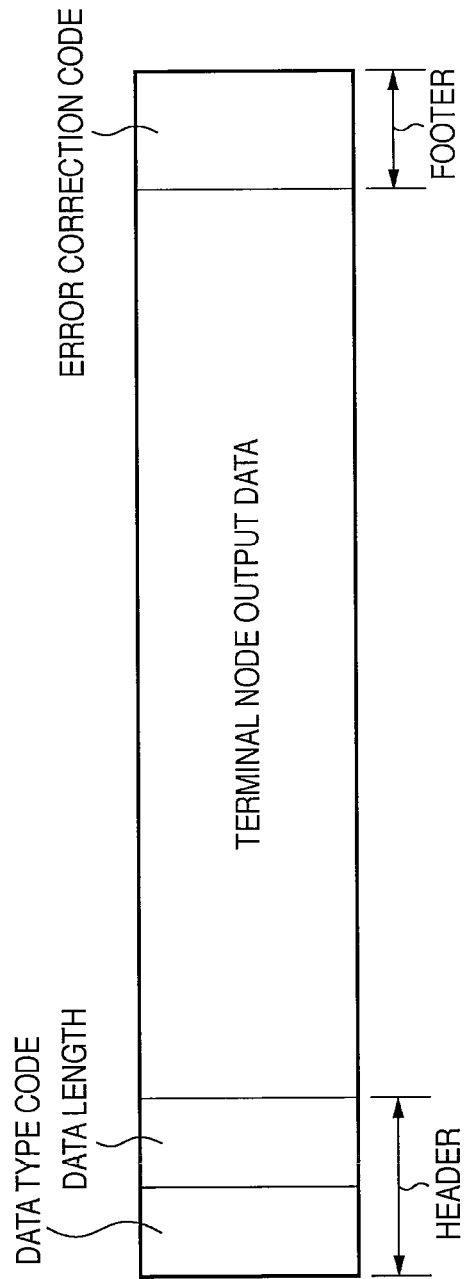

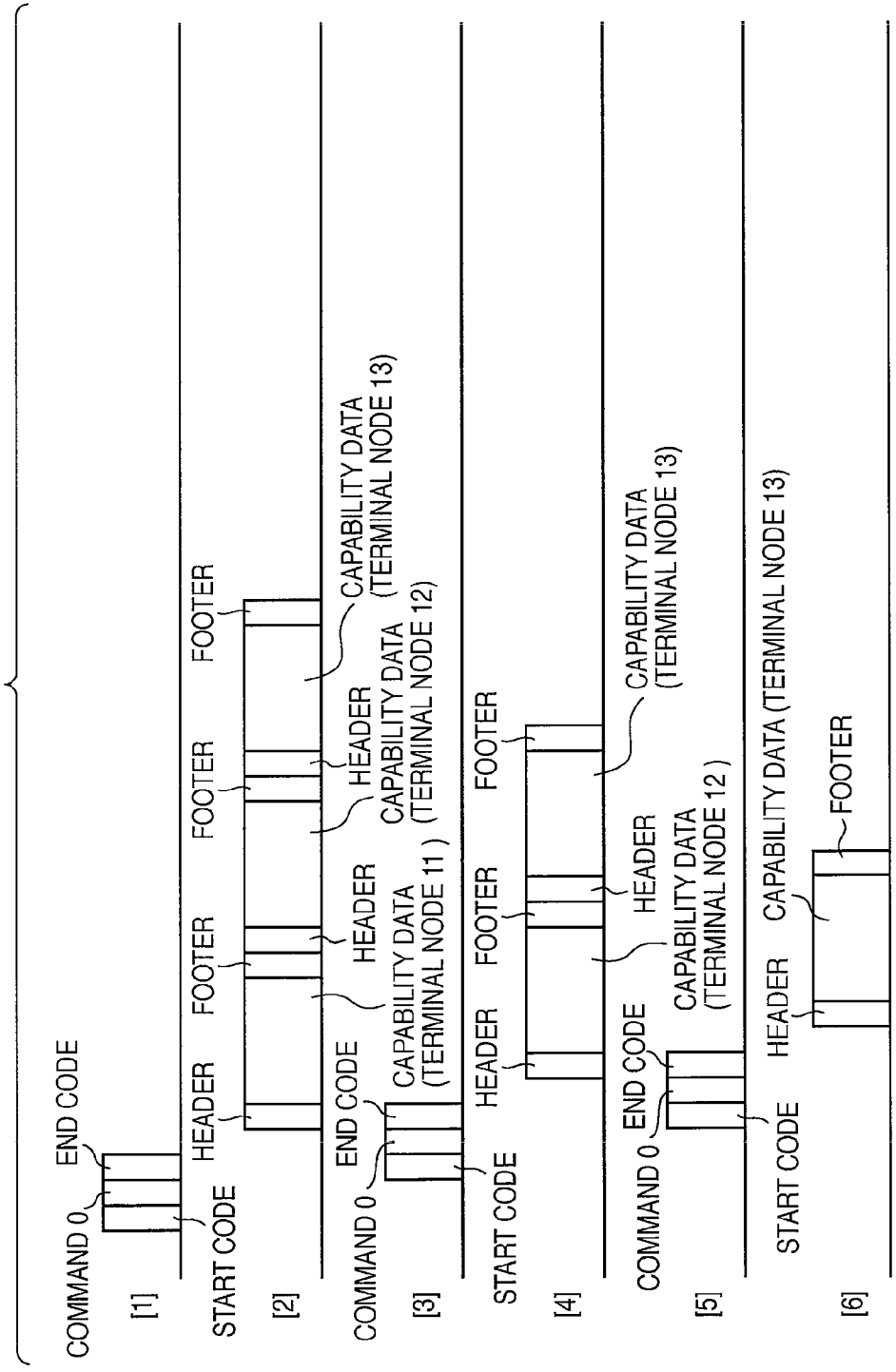

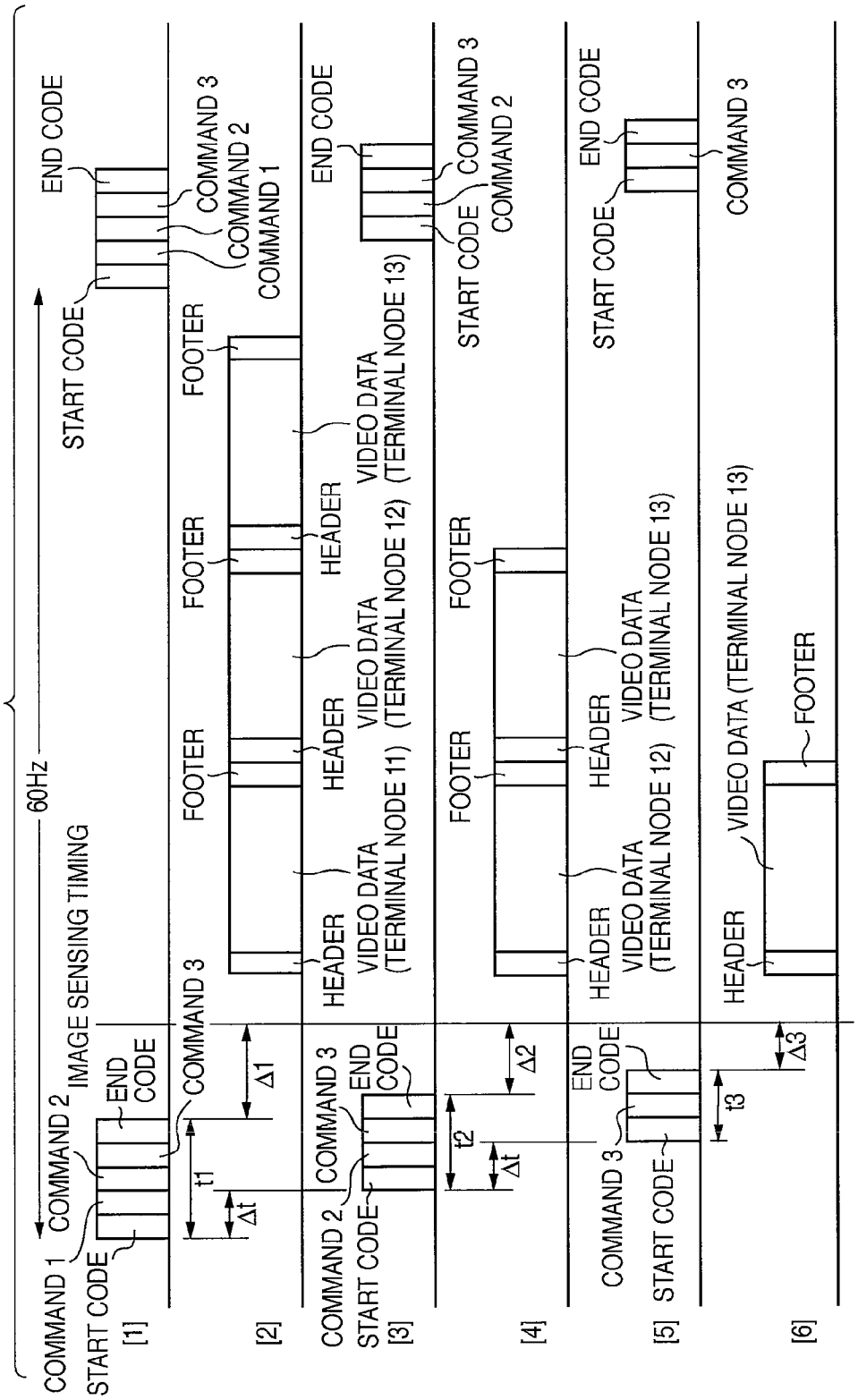

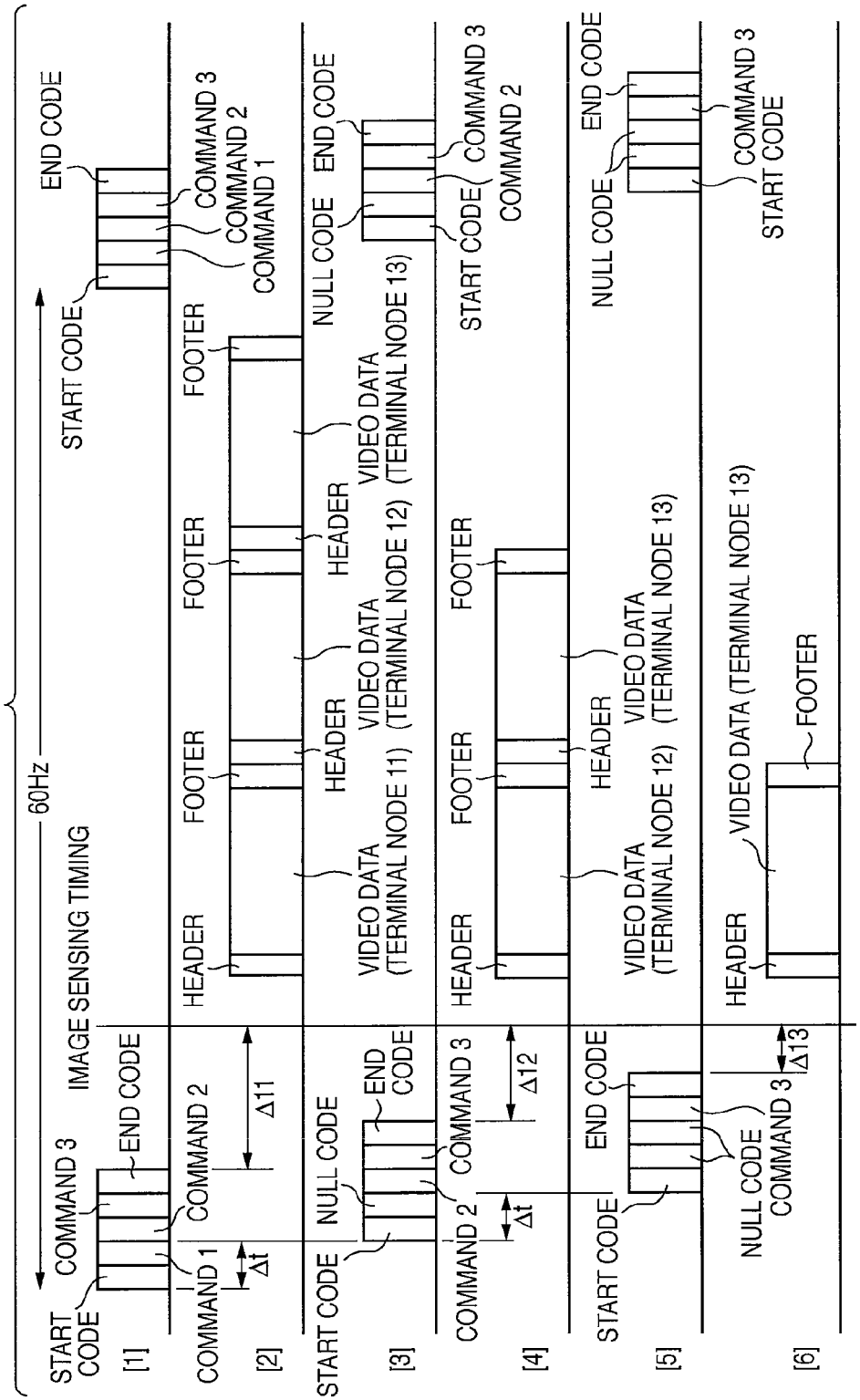

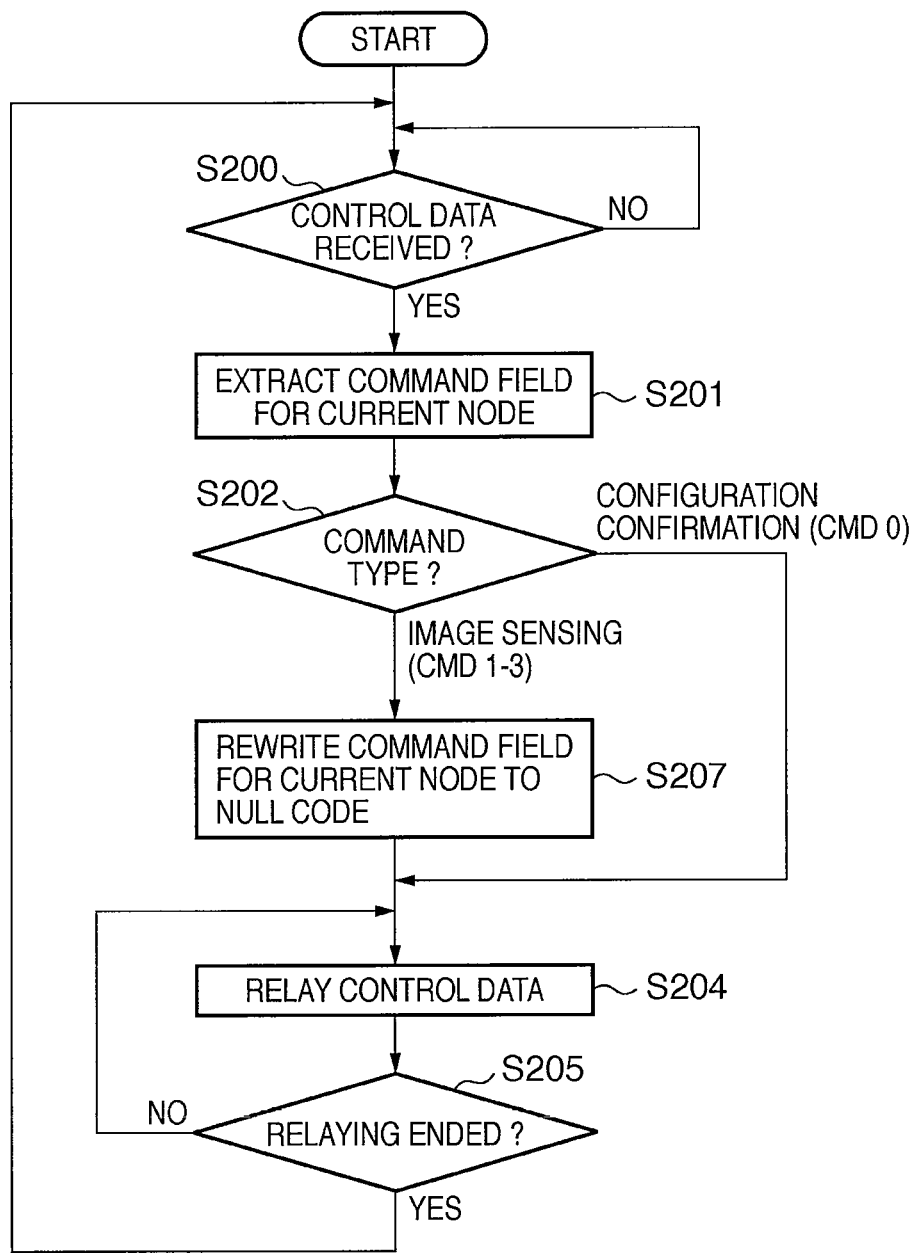

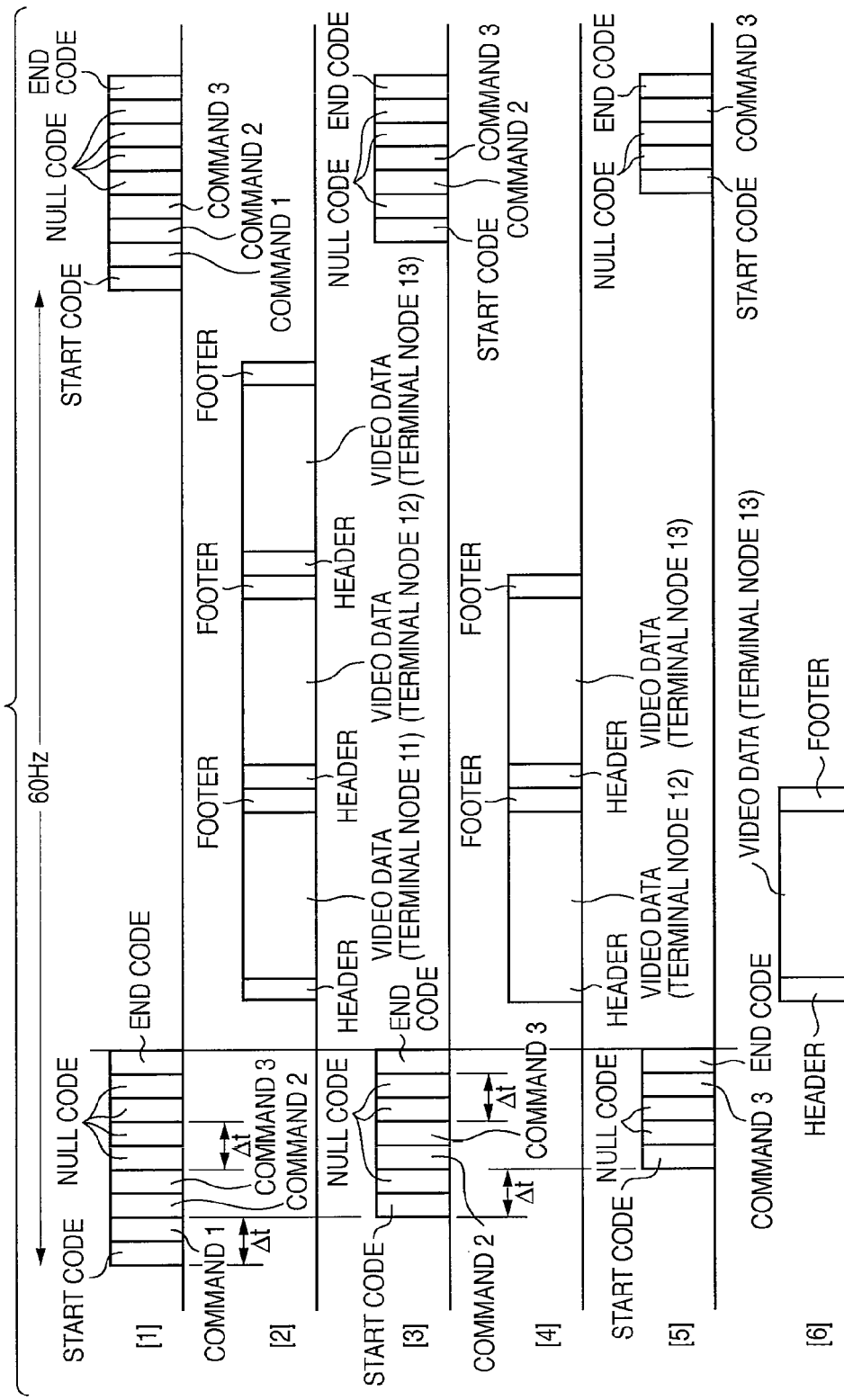

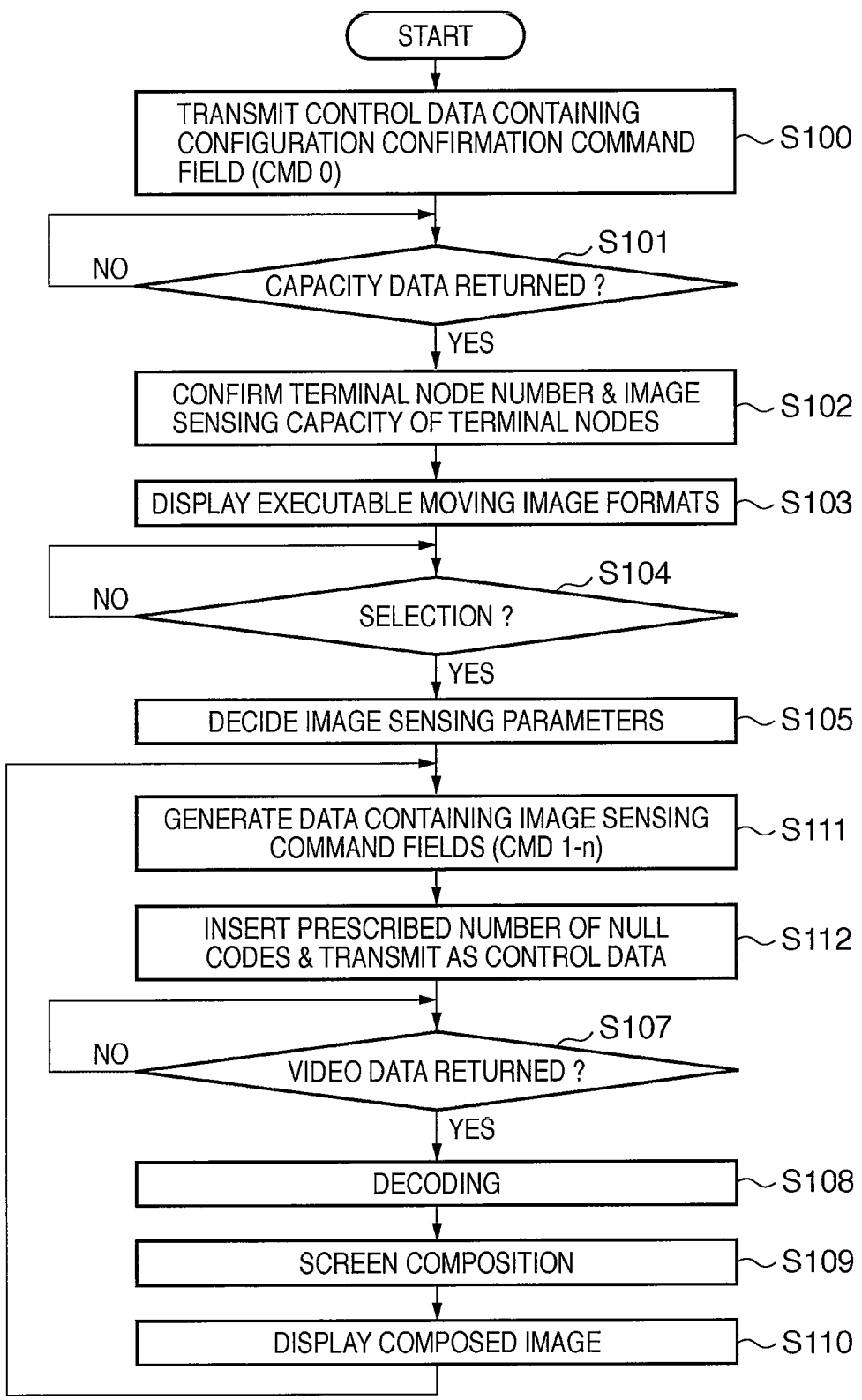

COMMUNICATION SYSTEM, COMMUNICATION APPARATUS AND COMMUNICATION METHOD OF COMMUNICATION SYSTEM

BACKGROUND OF THE INVENTION

1. Field of the Invention

The present invention relates to a communication system, a communication apparatus and a communication method of the communication system, and in particular to a technique for transferring data in a system in which a plurality of communication apparatuses are daisy chained.

2. Description of the Related Art

There exist video transfer systems in which a plurality of camera terminals and a controller are connected by a network. For example, a system in which a single controller and a plurality of cameras are daisy chained by a digital bus is disclosed in Japanese Patent Laid-Open No. 2003-69985. Also, a system in which a single camera control apparatus and a plurality of monitoring cameras are connected by a common bus on an AC power line that doubles as a communication line is disclosed in Japanese Patent Laid-Open No. 2004-179784.

In both examples, video data is transmitted reliably and the occurrence of dropped frames is suppressed by performing time-division multiplex communication in which the cameras are designated transfer timeslots to be used, and transmitting the video data of the cameras within the transfer timeslots.

Designating a transfer timeslot for each camera naturally requires that individual identification information or address identification codes such as ID codes or address codes be set in advance for the respective cameras using one method or another. However, usability is adversely affected if the user does the setting manually. Although a method of performing the setting automatically using some sort of protocol is also conceivable, this increases the processing load and complicates the device configuration.

Normally, communication for confirming the device configuration or the like on a network is performed prior to transmission of video data. Time-division multiplex communication performed after designating transfer timeslots cannot be implemented in a state where not even the number of nodes connected on the network is known. Accordingly, the communication protocol used at this time is completely different from the communication protocol used for communications using the transfer timeslots, inevitably complicating the configuration of the protocol stack and increasing the processing load.

Incidentally, when video from a plurality of camera terminals is composed and displayed on a single screen, the video frame cycles of the camera terminals desirably are synchronized. A simple video composition process suffices if the video frame cycles are synchronized, and the isochronism of video captured by the camera terminals is also ensured since the image sensing timing coincides.

Japanese Patent Laid-Open No. 2004-179784 refers to a frame image being output for each allocated transfer timeslot. This only means that the video data of the camera terminals arrives at the controller sequentially in video frames, and does not imply that the video frame cycles of the camera terminals are synchronized. In other words, synchronizing the video frame cycles of the camera terminals has not been taken into account at all in the above prior art.

SUMMARY OF THE INVENTION

In view of this, an object of the present invention is to perform data transfer by communication apparatuses efficiently.

According to one aspect of the present invention, a communication system in which a plurality of communication apparatuses and a communication control apparatus are daisy chained, wherein the communication control apparatus comprises:
a transmission unit adapted to transmit control data to the plurality of communication apparatuses; and
a reception unit adapted to receive data transmitted by the plurality of communication apparatuses, and
each communication apparatus comprises:
a reception unit adapted to receive data from another communication apparatus on a different side from a communication control apparatus side, in synchronous with receipt of the control data; and
a transmission unit adapted to transmit data to one of the communication control apparatus and another communication apparatus on the communication control apparatus side, and following the transmission, to transmit data received by the reception unit to the one of the communication control apparatus and the other communication apparatus on the communication control apparatus side, in synchronous with receipt of the control data.

According to another aspect of the present invention, a communication system in which a plurality of communication apparatuses and a communication control apparatus are daisy chained, wherein the communication control apparatus comprises:
a transmission unit adapted to transmit control data to the plurality of communication apparatuses; and
a reception unit adapted to receive data transmitted by the plurality of communication apparatuses, and
each communication apparatus comprises:
a determination unit adapted to determine whether the communication apparatus is positioned at an end of the daisy chain; and
a transmission unit adapted to switch, according to a determination result of the determination unit, between transmitting data of the communication apparatus to one of the communication control apparatus and another communication apparatus on a communication control apparatus side, and transmitting data of the communication apparatus after relaying data received from another communication apparatus on a different side from the communication control apparatus side to the one of the communication control apparatus and the other communication apparatus on the communication control apparatus side, in response to receipt of the control data.

According to still another aspect of the present invention, a communication apparatus daisy chained to another communication apparatus, comprises:

a reception unit adapted to receive, in synchronous with receipt of control data from a first communication apparatus daisy chained on one side, data from a second communication apparatus daisy chained on the other side; and
a transmission unit adapted to transmit data to the first communication apparatus, and following the transmission, to transmit data received by the reception unit to the first communication apparatus, in synchronous with receipt of the control data.

According to yet another aspect of the present invention, a communication apparatus daisy chained to another communication apparatus, comprises:

a determination unit adapted to determine whether the communication apparatus is positioned at an end of the daisy chain; and
a transmission unit adapted to switch, according to a determination result of the determination unit, between transmitting data of the communication apparatus to a first communication apparatus daisy chained on one side, and transmitting data of the communication apparatus after relaying data received from a second communication apparatus daisy chained on the other side to the first communication apparatus, in response to receipt of control data from the first communication apparatus.

According to still yet another aspect of the present invention, a communication method of a communication system in which a plurality of communication apparatuses and a communication control apparatus are daisy chained, comprises:

a receiving step, in each communication apparatus, of receiving data from another communication apparatus on a different side from a communication control apparatus side, in synchronous with receipt of control data from the communication control apparatus; and a transmitting step, in each communication apparatus, of transmitting data to one of the communication control apparatus and another communication apparatus on the communication control apparatus side, and following the transmission, transmitting data received in the receiving step to the one of the communication control apparatus and the other communication apparatus on the communication control apparatus side, in synchronous with receipt of the control data.

According to yet still another aspect of the present invention, a communication method of a communication system in which a plurality of communication apparatuses and a communication control apparatus are daisy chained, comprises:

a determining step, in each communication apparatus, of determining whether the communication apparatus is positioned at an end of the daisy chain; and a transmitting step, in the communication apparatus, of switching, according to a determination result in the determining step, between transmitting data of the communication apparatus to one of the communication control apparatus and another communication apparatus on a communication control apparatus side, and transmitting data of the communication apparatus after relaying data received from another communication apparatus on a different side from the communication control apparatus side to the one of the communication control apparatus and the other communication apparatus on the communication control apparatus side, in response to receipt of control data from the communication control apparatus.

Further features of the present invention will become apparent from the following description of exemplary embodiments (with reference to the attached drawings).

BRIEF DESCRIPTION OF THE DRAWINGS

FIGS. 4A, 4B and 4C show the format of control data and the format of transmission data transmitted from a terminal node to an upstream node.

FIG. 5 shows, in time-series, data transmitted between the master node and terminal nodes.

FIG. 7 shows, in time-series, data transmitted between the master node and terminal nodes.

FIG. 13 shows, in time-series, data transmitted between the master node and terminal nodes.

FIG. 14 is a flowchart showing an operation flow related to relaying of control data by a terminal node.

FIG. 16 shows, in time-series, data transmitted between the master node and terminal nodes.

FIG. 17 is a flowchart showing an operation flow of the master node.

DESCRIPTION OF THE EMBODIMENTS

Hereinafter, preferred embodiments that apply the present invention will be described in detail with reference to the accompanying drawings.

First Embodiment

Figure 1:
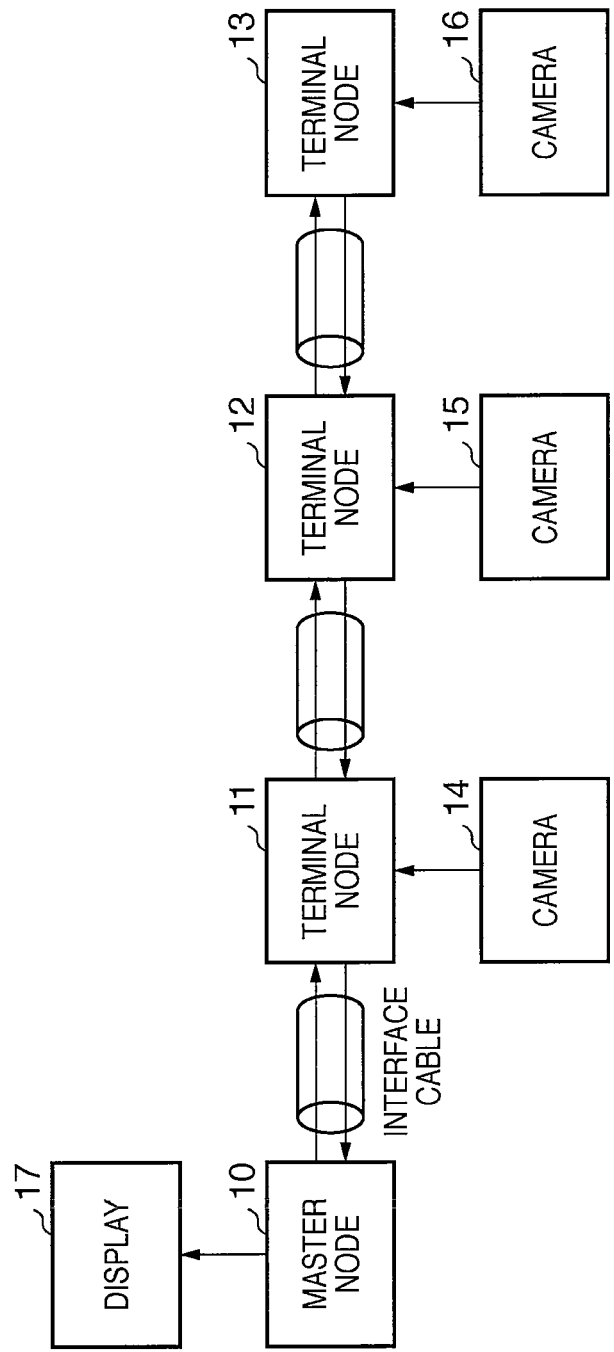
FIG. 1 is a block diagram showing a configuration of a network system according to an embodiment of the present invention.

Firstly, a first embodiment of the present invention will be described. FIG. 1 is a block diagram showing the configuration of a network system (communication system) according to the first embodiment of the present invention.

Reference numeral 10 denotes a master node. Reference numerals 11 to 13 denote terminal nodes capable of acquiring video data. The nodes are provided with a full-duplex serial interface, and are daisy chained by an interface cable constituting a communication line. Note that the master node 10 is an exemplary communication control apparatus of the present invention, while the terminal nodes 11 to 13 are exemplary communication apparatuses of the present invention.

Cameras 14 to 16 for capturing moving images are connected to the terminal nodes 11 to 13. A display 17 is connected to the master node 10. The above constituent elements as a whole functions as a video transmission system for displaying video captured by the cameras 14 to 16 on the display 17.

Note that while three terminal nodes are connected in FIG. 1, an arbitrary number of terminal nodes can be connected, with there being no restriction on the number of terminal nodes for implementing the present invention. Also, the interface connecting the nodes does not necessarily have to be full-duplex, and may be a half-duplex interface.

Figure 2:
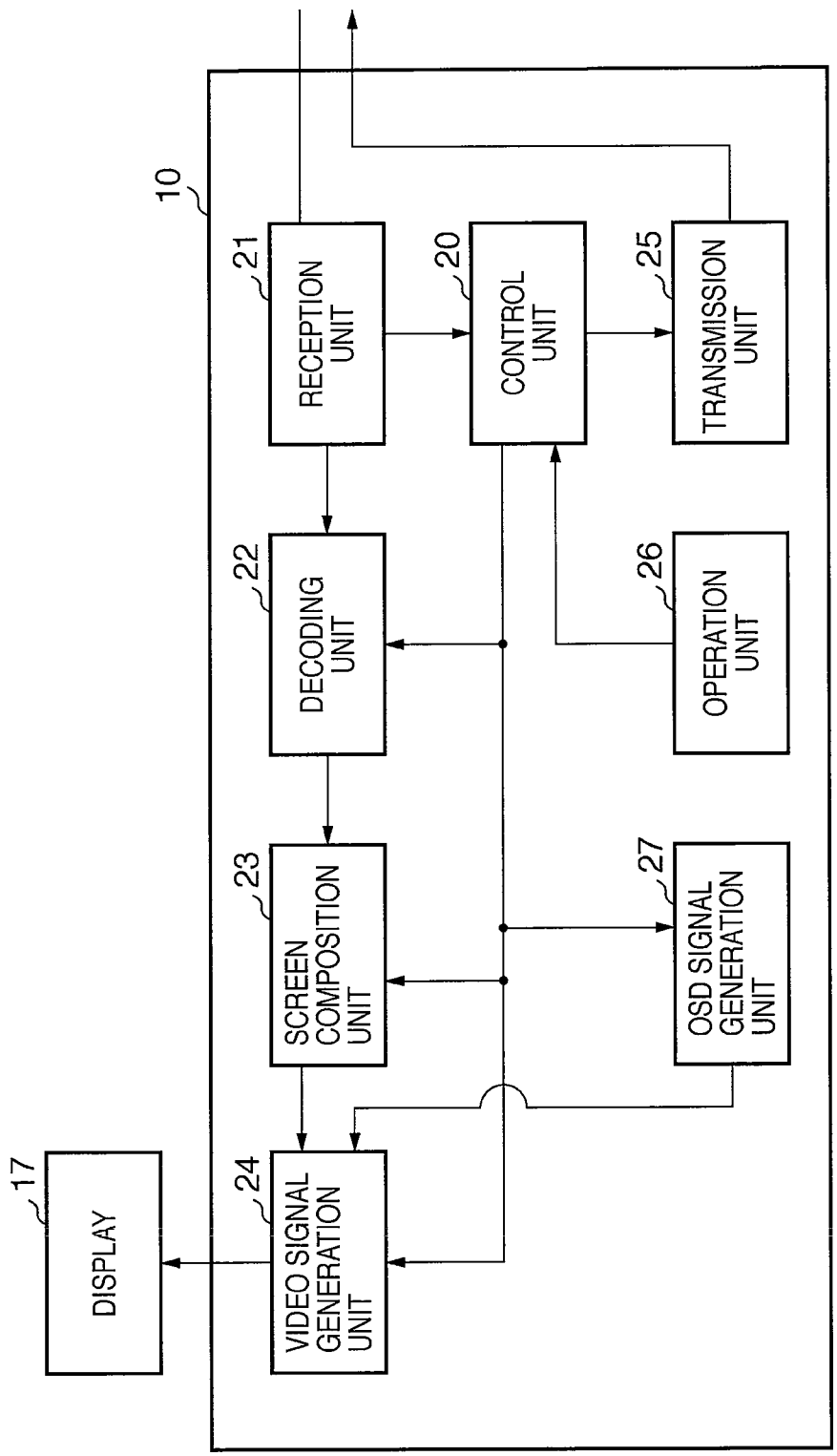
FIG. 2 is a block diagram showing a detailed configuration of a master node.

FIG. 2 is a block diagram showing a detailed configuration of the master node 10. Reference numeral 20 denotes a control unit that administers control of the entire apparatus, and is constituted specifically by a hard-wired sequencer circuit, program processing by a microprocessing unit (MPU), and the like. Reference numeral 21 denotes a reception unit that receives transmission data from the terminal nodes 11 to 13. Video data in the received transmission data is sent to a decoding unit 22. Video data transmitted from the terminal nodes 11 to 13 is encoded into a prescribed format (e.g., Motion-JPEG), so the decoding unit 22 converts this video data to uncompressed video data in RGB format or YUV format.

Since video data is transmitted from each of the terminal nodes 11 to 13, there is three screens worth of video data, although these screens are composed into a single screen (e.g., arranged side-by-side) by a screen composition unit 23 at the next stage. The video data composed by the screen composition unit 23 is sent to a video signal generation unit 24.

The video signal generation unit 24 generates a video signal (e.g., video signal complying with the DVI standard or the HDMI standard) for the display 17, based on the video data sent from the screen composition unit 23. Note that based on instructions from the control unit 20, the screen composition unit 23 is also able to send only video data received from a specified terminal node to the video signal generation unit 24, rather than a composition screen. Accordingly, the user is able to appropriately select composition screen display of a plurality of cameras or full screen display of a specified camera.

Reference numeral 27 denotes an OSD signal generation unit that generates an on-screen display (OSD) signal for text, symbols or the like to be display on the screen, based on instructions from the control unit 20. The generated OSD signal is sent to the video signal generation unit 24 and mixed with video captured by the cameras to generate the final video signal. Reference numeral 26 denotes an operation panel (operation unit) that gives operation instructions to the master node 10, and is constituted by press button switches and the like. Reference numeral 25 denotes a transmission unit that transmits control data to the terminal nodes, based on instructions from the control unit 20.

Figure 3:
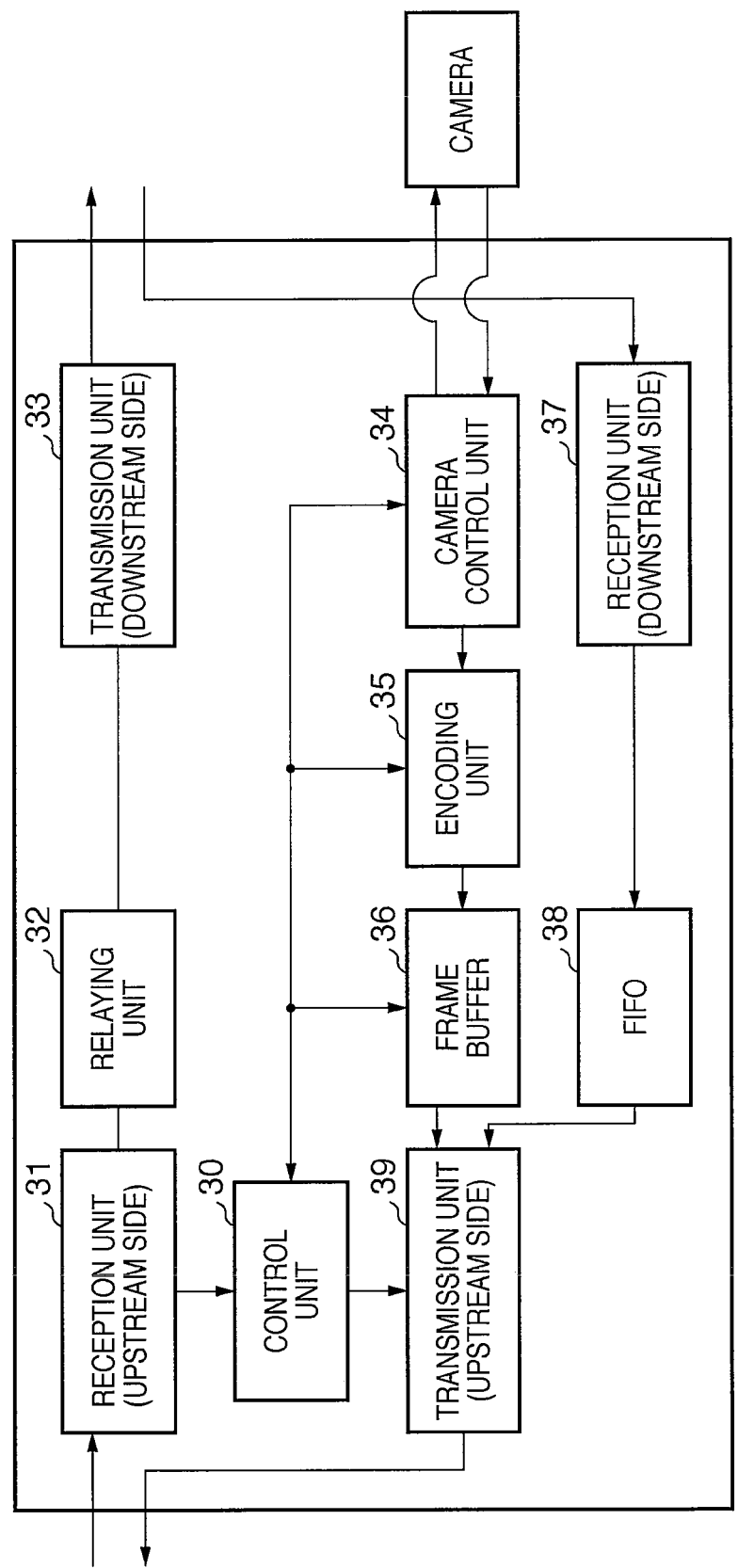
FIG. 3 is a block diagram showing a detailed configuration of a terminal node.

FIG. 3 is a block diagram showing a detailed configuration of the terminal nodes 11 to 13. Reference numeral 30 denotes a control unit that administers control of the entire apparatus, and is constituted specifically by a hardwired sequencer circuit, program processing by an MPU, and the like. The control unit 30 is equipped with a time counter that measures time at a prescribed resolution. The timer counter is used, when delaying the operation timing of the start of image sensing (described below) by a prescribed time, to measure the prescribed time. Reference numeral 31 denotes a reception unit (upstream side of daisy chain configuration) that receives control data from the master node 10. The received control data is sent to the control unit 30 and a relaying unit 32.

The relaying unit 32 is a processing block constituted by a buffer RAM, a hardwired sequencer circuit and the like, and performs processing to relay all received control data without modification or to relay received control data after changing part thereof. Processed control data is sent to a transmission unit 33 (downstream side of daisy chain configuration), and relayed to a downstream terminal node.

Note that in FIG. 3, the control unit 30 and the relaying unit 32 are independent blocks, although the processing of the relaying unit 32 can, of course, be realized as a result of software processing performed by the MPU of the control unit 30.

Reference numeral 34 denotes a camera control unit that controls the cameras 14 to 16 connected to the terminal nodes 11 to 13 based on instructions from the control unit 30, and inputs video data output from the cameras 14 to 16. The cameras 14 to 16 connected to the terminal nodes 11 to 13 are capable of performing image sensing at a plurality of resolutions (number of horizontal and vertical pixels), and are configured to capture and output only one frame of video at the designated resolution whenever there is an instruction from the camera control unit 34. A moving image (e.g., 60 fps) can be captured by repeating this operation at a prescribed cycle (e.g., 60 Hz).

Video data output from the cameras 14 to 16 is sent to an encoding unit 35 via the camera control unit 34. The encoding unit 35 converts the uncompressed video data (RGB or YUV format) output from the camera based on instructions from the control unit 30 to a prescribed format (e.g., Motion-JPEG) at a prescribed compression ratio. Encoded video data is stored in a frame buffer 36.

Reference numeral 37 denotes a reception unit (downstream side) that receives transmission data from a downstream node. Transmission data received by the reception unit 37 is stored in a First-In First-Out (FIFO) 38. Reference numeral 39 denotes a transmission unit (upstream side) that transmits arbitrary data instructed by the control unit 30, video data stored in the frame buffer 36, or transmission data stored in the FIFO 38 to an upstream node.

FIGS. 4A, 4B and 4C show the format of control data and the format of transmission data transmitted from a terminal node to an upstream node. There are two types of control data. FIG. 4A shows control data transmitted by the master node 10 when confirming the network configuration. This control data is constituted by a start code, a command code (configuration confirmation command) and an end code. The data shown in FIG. 4A is exemplary configuration confirmation data of the present invention.

FIG. 4B shows control data transmitted by the master node 10 when instructing the terminal nodes to perform video image sensing. This control data is constituted by a start code, command fields 1 to 3, and an end code. The command fields 1 to 3 are commands for the respective terminal nodes 11 to 13, and are constituted by a command code (image sensing command) and a parameter code thereof. The image sensing parameter code includes a resolution, a video data compression ratio (or video data size), and a delay time designating the operation timing of the start of image sensing. Note that while the term "command field" was not used in the description of FIG. 4A, the command field is constituted by only a command code since the configuration confirmation command does not have a parameter code. The bit string format of the parameter code is defined so as to not be the same as the start code, command codes (configuration confirmation command, image sensing command) or end code. The data shown in FIG. 4B is exemplary control data of the present invention.

Each terminal node accepts only one of the command fields following the start code as the command for that node and disregards the other command fields. As such, the control data is relayed to the downstream node after deleting the command field for the current node and moving the following command fields up one place. Note that because there is only one command field in the case where a common operation instruction is given to the terminal nodes, as shown in FIG. 4A, received control data is relayed as is to the downstream node without deleting command fields.

FIG. 4C shows transmission data transmitted by a terminal node to an upstream node. As shown in FIG. 4C, the transmission data is constituted by a data type code (code showing whether the data is capability data (discussed below) or video data), a data length, output data, and an error correction code.

In the network system of the present embodiment, the master node 10 firstly begins by confirming the network configuration. The master node 10 thus transmits the control data for configuration confirmation shown in FIG. 4A to the terminal nodes. The terminal nodes each return data (capability data) showing the capability of that node, in response to the control data. The capability data includes a maximum frames-per-second (fps) value, selectable resolutions, selectable video data compression ratios, and a rough data size in each case.

FIG. 5 shows, in time-series, data transmitted between the master node 10 and the terminal nodes 11 to 13. In order from the top of FIG. 5, [1] represents data at the transmitting end of the master node 10 (upstream receiving end of terminal node 11), [2] represents data at the upstream transmitting end of the terminal node 11 (receiving end of master node 10), [3] represents data at the downstream transmitting end of the terminal node 11 (upstream receiving end of terminal node 12), [4] represents data at the upstream transmitting end of the terminal node 12 (downstream receiving end of terminal node 11), [5] represents data at the downstream transmitting end of the terminal node 12 (upstream receiving end of terminal node 13), and [6] represents data at the upstream transmitting end of the terminal node 13 (downstream receiving end of terminal node 12). The command 0 represents the command field for configuration confirmation.

As evident from [1], [3] and [5] in FIG. 5, control data is relayed to the downstream node without modification. Each terminal node generates capability data for that node after receiving the control data (or more precisely, after receiving the end code), and transmit the capability data to the upstream node. At this time, the transmission data received from the downstream node is stored in the FIFO 38 illustrated in FIG. 3. Each terminal node, after transmitting the capability data for that node, sends the transmission data stored in the FIFO 38 to the upstream node in succession. The FIFO 38 is an exemplary storage medium of the present invention.

Performing these operations in each terminal node results in the capability data of the terminal nodes 11 to 13 being transmitted to the master node 10 in the stated order ([2] in FIG. 5). Note that the end code not only signifies the end of the control data, but also instructs the execution start of the command and the transmission start of output data generated as a result, as is clear from the above description.

The master node 10 is able to know the number of terminal nodes existing on the network from the number of incoming pieces of capability data, and the capability of each terminal node from the content of the capability data. Note that the capability data is exemplary configuration data of the present invention.

Next, the master node 10 transmits control data for instructing image sensing to the terminal nodes. The terminal nodes perform image sensing in response to this control data, and return video data.

Figure 6A:
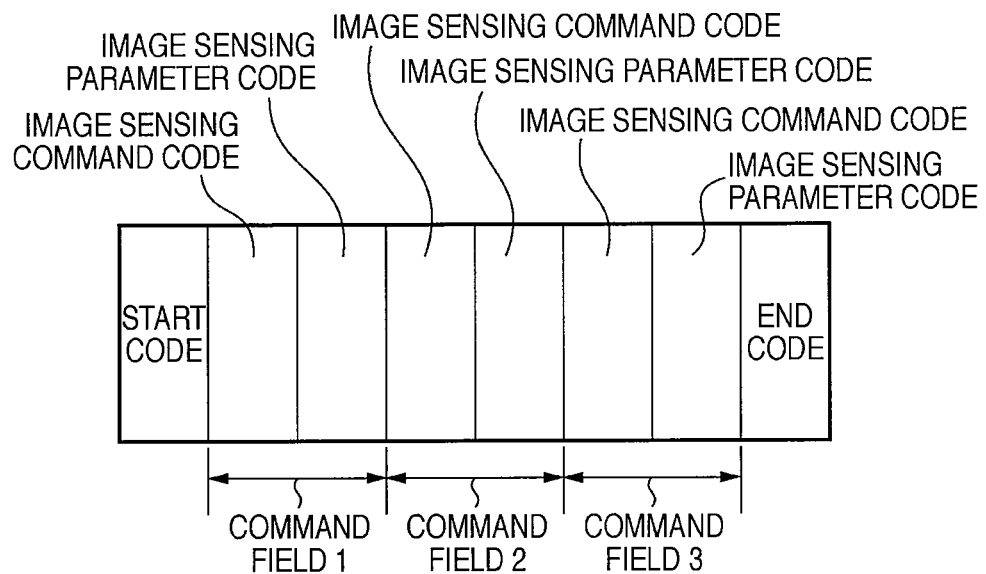
FIGS. 6A, 6B and 6C show a detailed configuration of control data used by the master node for instructing image sensing.
Figure 6B:
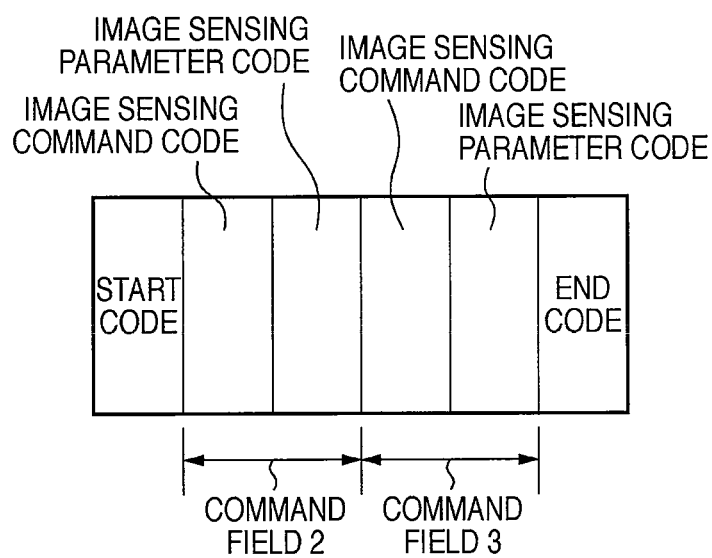
Figure 6C:
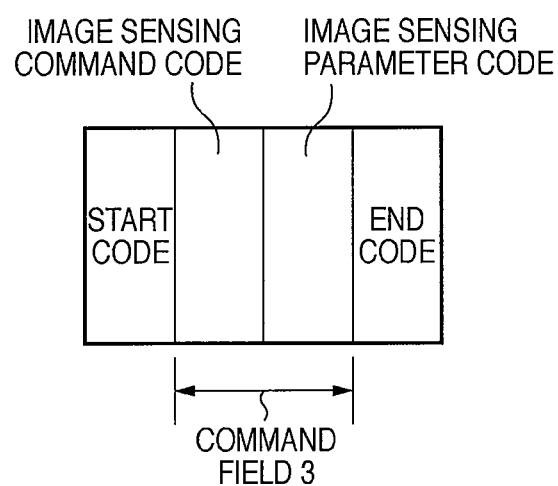

FIGS. 6A, 6B and 6C show a detailed configuration of control data used by the master node 10 for instructing image sensing. FIG. 6A shows control data transmitted by the master node 10 to the terminal node 11. FIG. 6B shows control data transmitted (relayed) by the terminal node 11 to the terminal node 12. FIG. 6C shows control data transmitted (relayed) by the terminal node 12 to the terminal node 13. As is clear from FIGS. 6A, 6B and 6C, each terminal node relays received control data to the downstream node after deleting the command field for that node.

FIG. 7 shows, in time-series, data transmitted between the master node 10 and the terminal nodes 11 to 13 when transmitting captured video data. In order from the top of FIG. 7, [1] represents data at the transmitting end of the master node 10 (upstream receiving end of terminal node 11), [2] represents data at the upstream transmitting end of the terminal node 11 (receiving end of master node 10), [3] represents data at the downstream transmitting end of the terminal node 11 (upstream receiving end of terminal node 12), [4] represents data at the upstream transmitting end of the terminal node 12 (downstream receiving end of terminal node 11), [5] represents data at the downstream transmitting end of the terminal node 12 (upstream receiving end of terminal node 13), and [6] represents data at the upstream transmitting end of the terminal node 13 (downstream receiving end of terminal node 12). The commands 1 to 3 represent command fields for instructing the terminal nodes 11 to 13 to perform image sensing.

As also illustrated in FIGS. 6A, 6B and 6C, the control data shown in [1], [3] and [5] in FIG. 7 is relayed to the downstream node after deleting the command field for the current node. After receiving this control data, each terminal node performs image sensing in accordance with the image sensing parameters, generates video data, and transmits the video data to the upstream node. Different from the configuration confirmation, however, the terminal nodes do not execute image sensing immediately after receiving the end code. As evident from [1], [3] and [5] in FIG. 7, the arrival of the control data at each terminal node is delayed by a transmission delay time resulting from the relaying. As such, the image sensing timing of the terminal nodes, that is, the timing at which video data is acquired, is made to coincide by delaying the start of image sensing by a delay time designated by the image sensing parameters.

This is represented as follows, where $\Delta t$ is the transmission delay time resulting from the relaying, t1, t2 and t3 are the respective transmission times of control data to the terminal nodes 11 to 13, and $\Delta 1$, $\Delta 2$ and $\Delta 3$ are the delay times to be designated to the terminal nodes.

$$\Delta 3 = \tau \qquad (1)$$

$$\Delta 2 = \Delta 3 + (\Delta t - t2 + t3) = \tau + \Delta t - t2 + t3 \qquad (2)$$

$$\Delta 1 = \Delta 2 + (\Delta t - t1 + t2) = \tau + 2\Delta t - t1 + t3 \qquad (3)$$

Note that $\tau \geq 0$.

Because the terminal node 13 is the end node, $\Delta 3$ need merely be an arbitrary delay time equal to or greater than 0, and the upstream terminal node is designated a value obtained by adding $\Delta 3$ to the transmission delay time corrected for the amount by which the control data is shortened when relayed. As evident from [2], [4] and [6] in FIG. 7, the designated delay time is greater the further upstream the terminal node.

After the image sensing, the generated video data is transmitted to the upstream node after being encoded into a prescribed format. At this time, transmission data received from the downstream node is stored in the FIFO 38 illustrated in FIG. 3. Each terminal node, after transmitting the video data for that node, sends (relays) the transmission data stored in the FIFO 38 to the upstream node in succession. Performing these operations in each terminal node results in the video data of the terminal nodes 11 to 13 being transmitted to the master node 10 in the stated order ([2] in FIG. 7).

Repeating the above operations at a prescribed cycle of 60 Hz, for example, enables a 60 fps moving image to be displayed on the display 17 connected to the master node 10. Moreover, the image sensing timing of the terminal nodes coincides, and the moving image is displayed on the display 17 with the video frame cycles synchronized.

Next, the operations of the network system according to the present embodiment will be described using the flowcharts of FIGS. 8 to 10.

Figure 8:
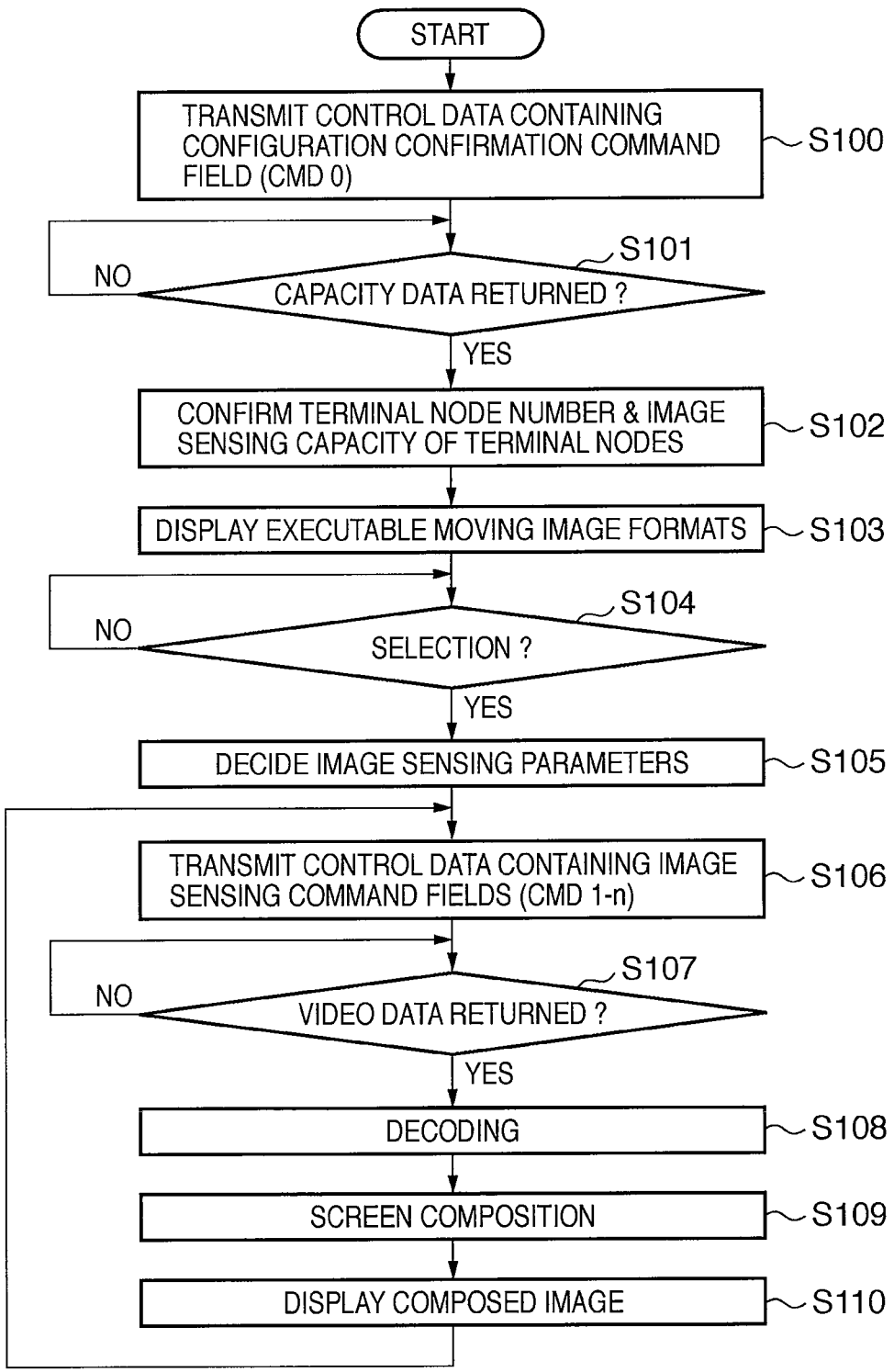
FIG. 8 is a flowchart showing an operation flow of the master node.

FIG. 8 is a flowchart showing an operation flow of the master node 10. Firstly, at step S100, the master node 10 transmits control data containing the configuration confirmation command (command 0), and waits at step S101 for capability data to be returned from the terminal nodes.

On receiving capability data from the terminal nodes, the master node 10 at step S102 confirms the number of terminal nodes connected to the network and the respective image sensing capacities thereof. At the next step S103, the master node 10 OSD displays a list of candidate executable moving image formats (frames-per-second, resolutions of terminal nodes, video data compression ratios) on the display 17, based on the information confirmed in step S102. At step S104, the master node 10 waits for the user to make a selection from the candidate list. A selection instruction is given via the operation unit 26 shown in FIG. 2.

Once a selection instruction is given, the master node 10, at step S105, decides the image sensing parameters for the terminal nodes, based on the user selection.

At the next step S106, the master node 10 transmits control data containing image sensing command fields (commands 1 to 3) with the values decided at step S105 as the parameter code, and waits at step S107 for video data to be returned from the terminal nodes.

Here, the image sensing parameters for the terminal nodes need not be the same, and the resolution and compression ratio of video data may be decided separately for each terminal node. Delay times designating the operation timing of the start of image sensing designate a different value for each terminal node as illustrated above with equations 1 to 3.

Incidentally, frames-per-second (fps) is decided by the cycle at which the master node 10 repeatedly transmits control data, rather than being instructed to the terminal nodes as an image sensing parameter. Accordingly, frames-per-second (fps) is common between the terminal nodes.

The number of video frames can be prioritized (set high fps) and image quality reduced (low resolution, high compression ratio), or conversely, image quality may be prioritized (high resolution, low compression ratio) and the number of video frames reduced. Which will be prioritized in the image sensing depends on the user's selection instruction. In other words, the frames-per-second (fps) and image sensing parameters must be decided so that the video data per frame returned to the master node 10 does not exceed the maximum transmission band of the serial interface connecting the nodes.

Returning again to the flowchart of FIG. 8, the master node 10, on receiving video data from the terminal nodes, decodes the video data at step S108, and composes the video from the terminal nodes into a single screen at step S109. At the next step S110, the master node 10 displays the composed video data on the display 17. Note that in the case where only the video data received from a specified terminal node is displayed, the composition process of step S109 may be omitted. Subsequently, the processing of step S106 is repeatedly executed at the prescribed cycle, that is, at the cycle corresponding to the frames-per-second (fps) selected by the user.

Figure 9:
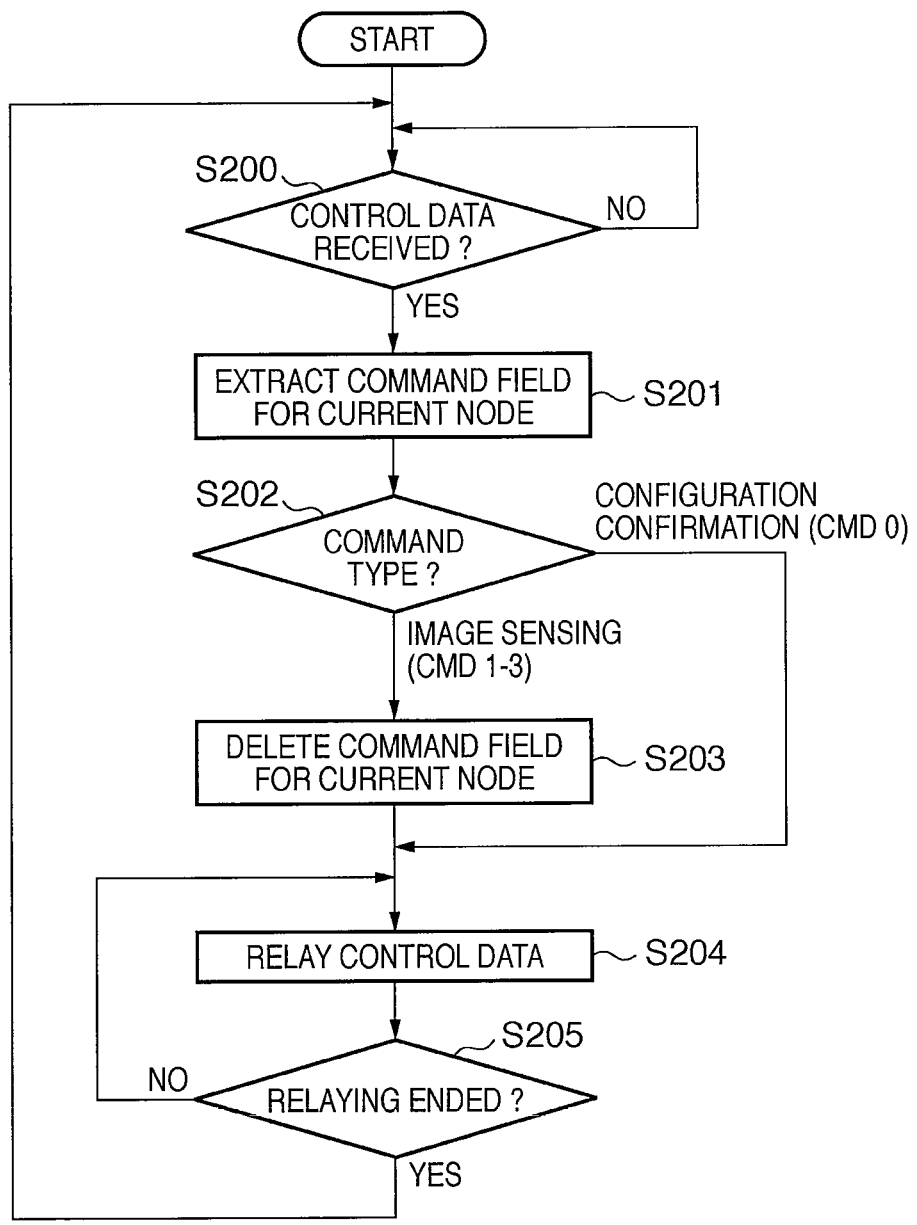
FIG. 9 is a flowchart showing an operation flow related to relaying of control data by a terminal node.

FIG. 9 is a flowchart showing an operation flow related to relaying of control data by a terminal node.

Firstly, the terminal node waits to receive control data at step S200, and on receiving control data, extracts the command field for that node at step S201.

Next, the terminal node determines at step S202 whether the extracted command field is an image sensing command field or a configuration confirmation command field. In the case of the image sensing command field, the terminal node deletes the command field for that node at step S203. The terminal node then relays the control data having part thereof deleted to the downstream node at step S204. Next, the terminal node determines at step S205 whether the relaying of control data has ended. Once the relaying of control data has ended, the processing returns to step S202 via step S200.

On the other hand, if it is determined in step S202 to be the configuration confirmation command field, the terminal node relays the received control data as is to the downstream node at step S204 and S205, without deleting the command field. The terminal node repeatedly executes the processing of steps S200 to S205 shown above.

Figure 10:
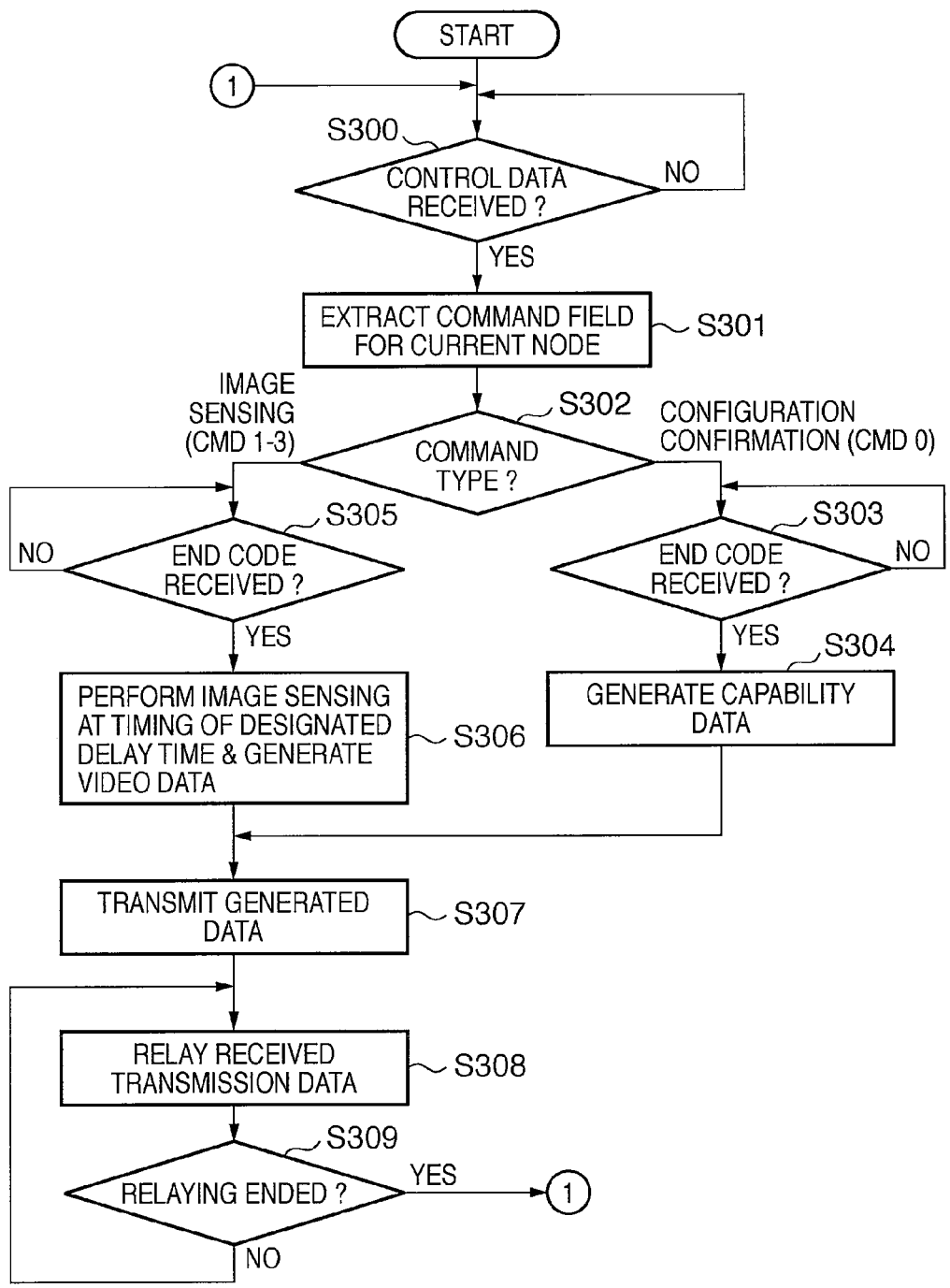
FIG. 10 is a flowchart showing an operation flow related to processing by a terminal node to transmit the output data of that node and relay transmission data received from a downstream node.

FIG. 10 is a flowchart showing an operation flow related to processing by a terminal node to transmit the output data of that node and relay transmission data received from a downstream node.

The terminal node waits at step S300 to receive control data, and on receiving control data, extracts the command field for that node at step S301.

At the next step S302, the terminal node determines whether the extracted command field is an image sensing command field or a configuration confirmation command field. In the case of the configuration confirmation command field, the terminal node waits at step S303 to receive the end code, and generates capability data at step S304 after receiving the end code.

On the other hand, if it is determined at step S302 to be the image sensing command field, the terminal node waits at step S305 to receive the end code. After receiving the end code, the terminal node performs video image sensing at the timing of the designated delay time at step. S306, and generates (encoded) video data.

In the case of both command fields, the terminal node transmits the generated output data to the upstream node at step S307. Then, at step S308, the terminal node relays all of the transmission data received from the downstream node to the upstream node, and determines at step S309 whether the relaying has ended. The relaying process of step S308 is executed until the relaying has ended. The terminal node repeatedly executes the processing of steps S300 to S309 described above.

As described above, the network system of the present embodiment enables a network system to be realized that utilizes simple communication protocols with a low processing load that are commonly used for configuration confirmation and video data transmission. Moreover, the network system of the present embodiment does not require transfer timeslots to be designated for each terminal node when performing data transmission. Accordingly, setting of individual identification information, address identification codes or the like is completely unnecessary, and, moreover, this can be realized with a simple device configuration, without requiring complex protocol processing.

The network system of the present embodiment has the excellent effect of being able to synchronize, with high precision, the frame cycles of video captured by terminal nodes.

Second Embodiment

In the foregoing embodiment, received control data is relayed to a downstream node after deleting part thereof, although a similar effect can be obtained by relaying the control data to a downstream node after rewriting, rather than deleting, part thereof to a different control code. That is, a null code can be defined that has no effect whatsoever on the nodes, and the control data can be relayed after rewriting to the null code and thereby invalidating the command field for the current node. Note that the configuration of the network system according to the present embodiment is similar to the configuration of the network system according to the first embodiment.

Figure 11A:
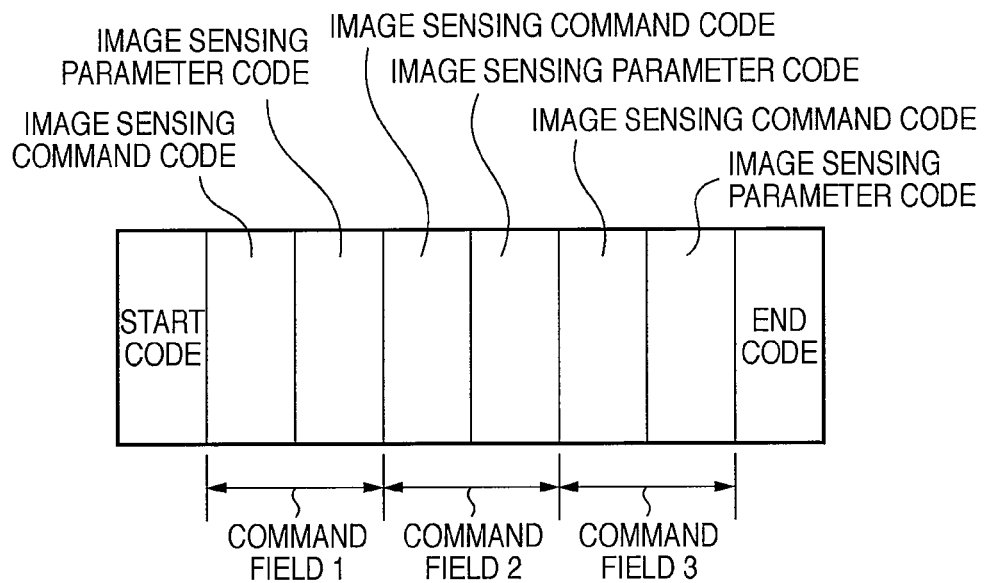
FIGS. 11A, 11B and 11C show a detailed configuration of control data.
Figure 11B:
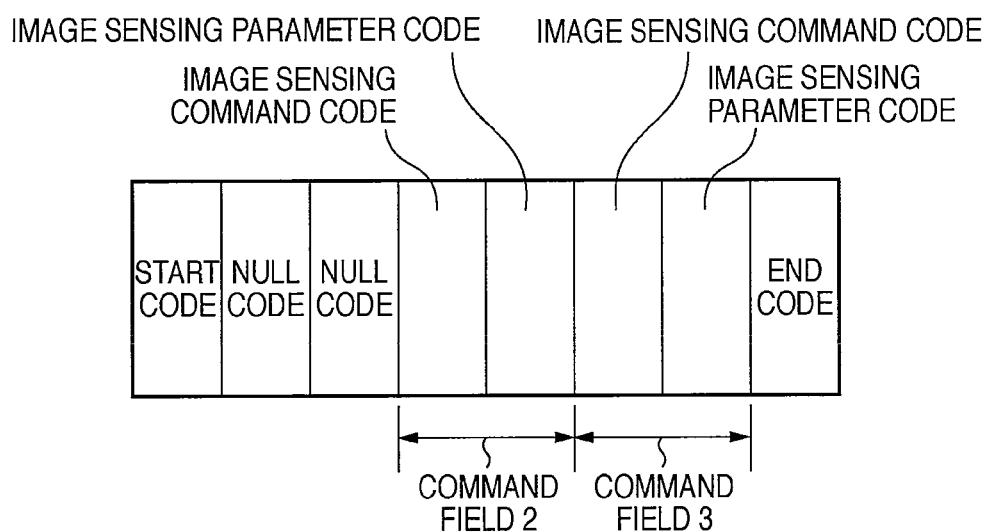
Figure 11C:
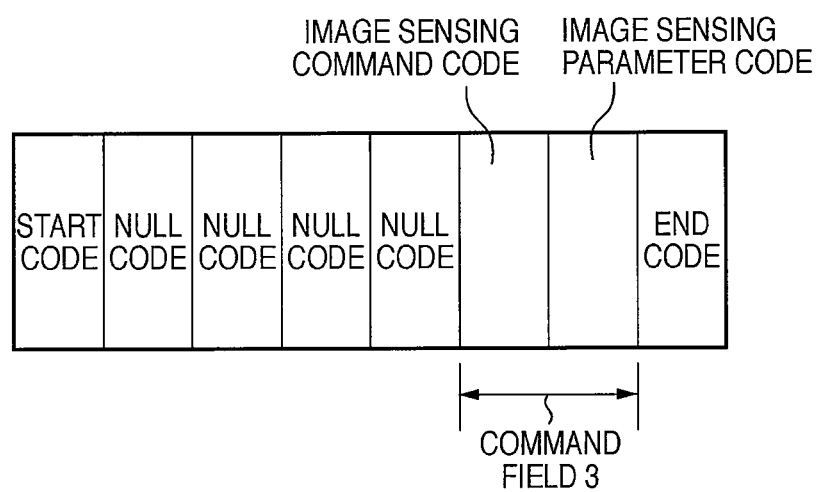

FIGS. 11A, 11B and 11C show a detailed configuration of control data in the second embodiment of the present invention. FIG. 11A shows control data transmitted by the master node 10 to the terminal node 11. FIG. 11B shows control data transmitted (relayed) by the terminal node 11 to the terminal node 12. FIG. 11C shows control data transmitted (relayed) by the terminal node 12 to the terminal node 13. As is clear from FIGS. 11A, 11B and 11C, each terminal node relays received control data to the downstream node after rewriting the command field for that node to the null code.

Figure 12A:
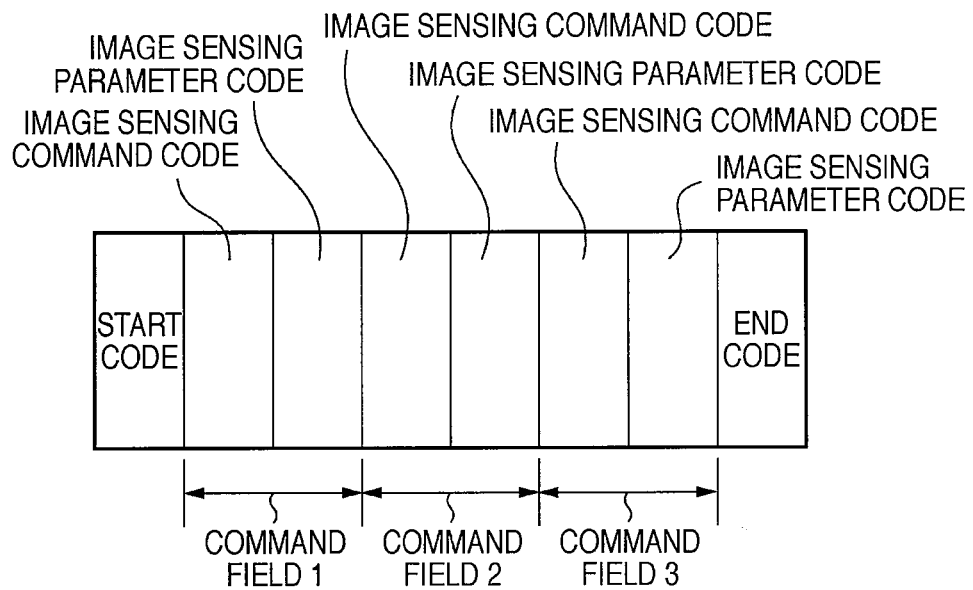
FIGS. 12A, 12B and 12C show a detailed configuration of control data.
Figure 12B:
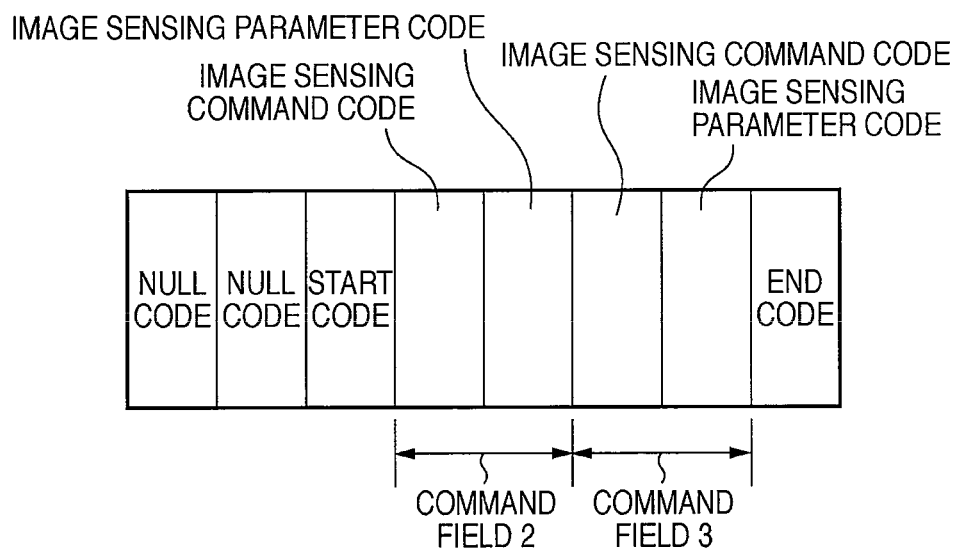
Figure 12C:
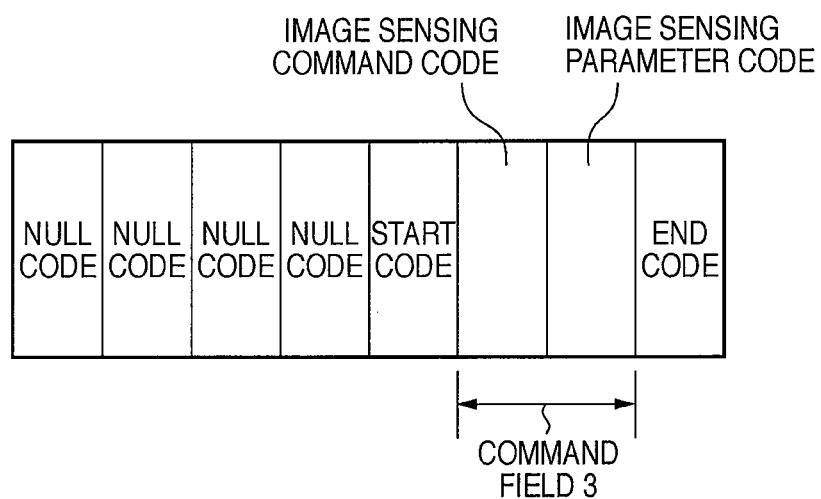

Alternatively, the control data may be configured as shown in FIGS. 12A, 12B and 12C. That is, FIG. 12A shows control data transmitted by the master node 10 to the terminal node 11. FIG. 12B shows control data transmitted by the terminal node 11 to the terminal node 12. FIG. 12C shows control data transmitted by the terminal node 12 to the terminal node 13. The start code may thus be set immediately prior to the command field for the next terminal node, and all control codes prior to that may be rewritten to the null code.

FIG. 13 shows, in time-series, data transmitted between the master node 10 and the terminal nodes 11 to 13 in the second embodiment of the present invention, and is equivalent to FIG. 7 in the first embodiment. A difference with FIG. 7 lies in the fact that the length of the relayed control data does not change. Accordingly, the delay times to be designated to the terminal nodes may be obtained simply by adding the transmission delay time.

This is represented as follows, where $\Delta t$ is the transmission delay time resulting from the relaying, and $\Delta 11$, $\Delta 12$ and $\Delta 13$ are the delay times to be designated to the terminal nodes.

$$\Delta 13 = \tau \qquad (4)$$

$$\Delta 12 = \tau + \Delta t \qquad (5)$$

$$\Delta 11 = \tau + 2\Delta t \qquad (6)$$

Note that $\tau \geq 0$.

FIG. 14 is a flowchart showing an operation flow related to relaying of control data by a terminal node in the second embodiment, and is equivalent to FIG. 9 in the first embodiment. Steps S200 to S202 and S204 to S205 in FIG. 14 are the same as the description in FIG. 9. Only step S207 (equivalent to step S203 in FIG. 9) is different, and involves the terminal node rewriting the command field for that node to the null code, rather than deleting the command field.

As described above, a network system having a similar effect to the first embodiment can also be realized in the present embodiment. Moreover, since the length of the control data does not change as a result of the relaying of control data in the present embodiment, the delay times to be designated to the terminal nodes can be derived with an extremely simple calculation.

Third Embodiment

In the foregoing embodiment, the frame cycles of video captured by the terminal nodes are synchronized by designating delay times for delaying the operation timing of the start of image sensing in the terminal nodes by a prescribed time, although this can also be realized with only the relaying process. Note that the configuration of the network system according to the present embodiment is similar to the configuration of the network system according the first embodiment.

That is, one or more null codes for use in delay time adjustment are placed in the control data transmitted by the master node 10, and the terminal nodes need merely delete null codes of a data amount equivalent to the transmission delay time when relaying the control data.

Figure 15A:
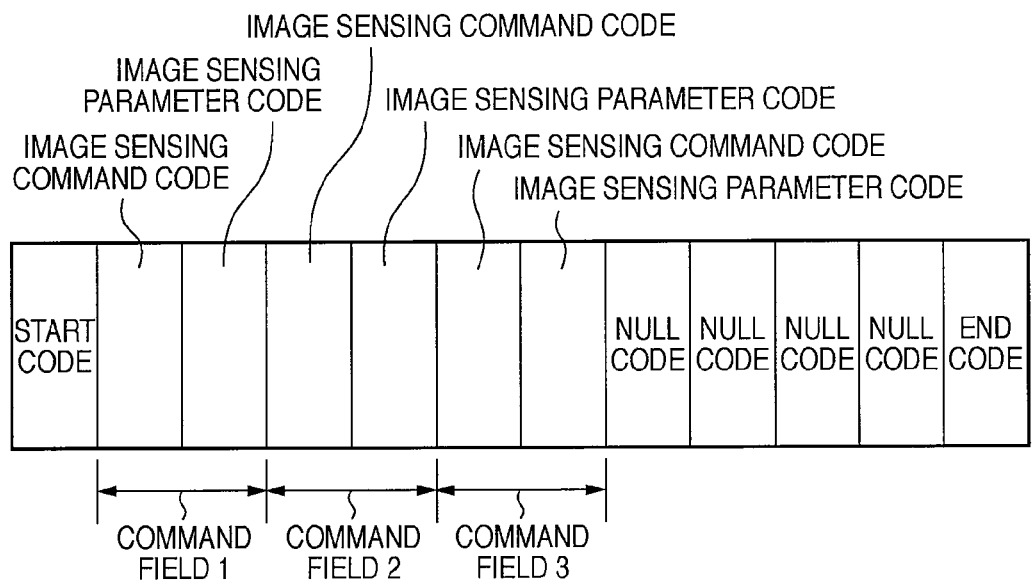
FIGS. 15A, 15B and 15C show a detailed configuration of control data.
Figure 15B:
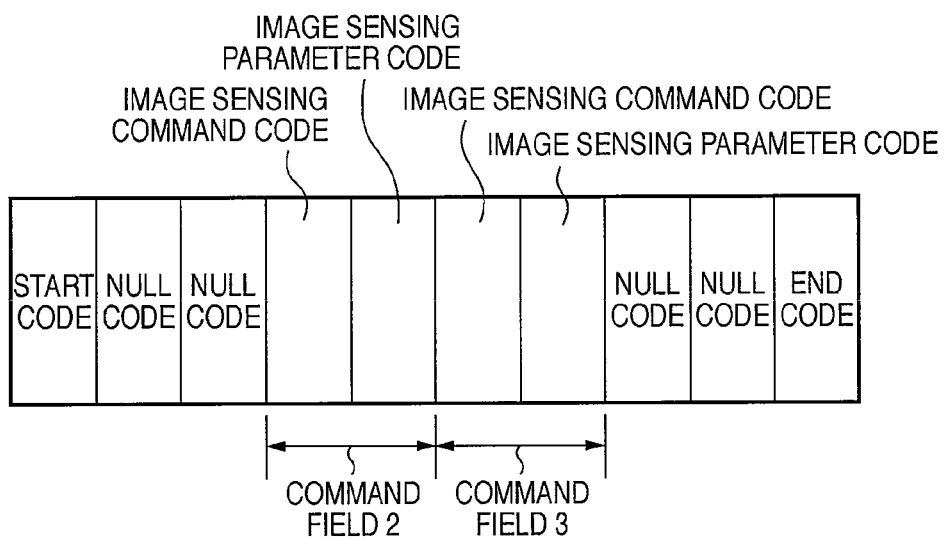
Figure 15C:
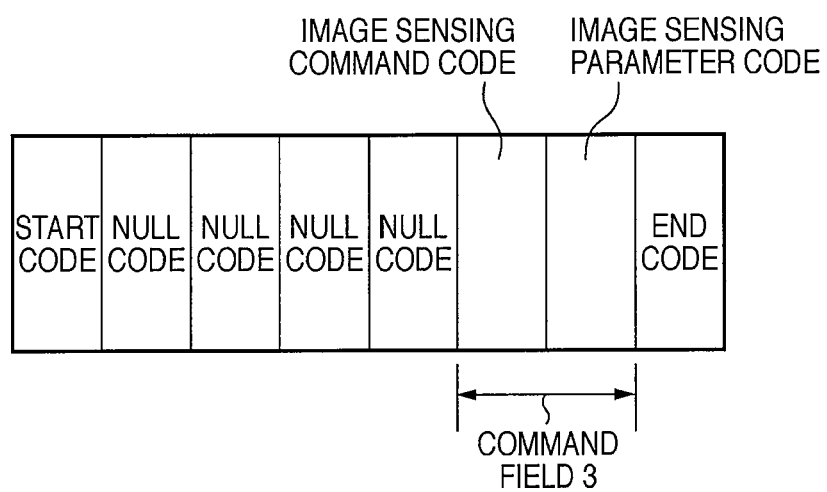

FIGS. 15A, 15B and 15C show a detailed configuration of control data in the third embodiment of the present invention. FIG. 15A shows control data transmitted by the master node 10 to the terminal node 11. FIG. 15B shows control data transmitted (relayed) by the terminal node 11 to the terminal node 12. FIG. 15C shows control data transmitted (relayed) by the terminal node 12 to the terminal node 13. Note that in the present embodiment, delay time information for designating to the terminal nodes is not included in the image sensing parameters.

As shown in FIG. 15A, a plurality of null codes for delay time adjustment are placed in front of the end code in the control data transmitted by the master node 10. As shown in FIGS. 15B and 15C, whenever control data is relayed by a terminal node, the control data is relayed to the downstream node after null codes equivalent in number to the transmission delay time have been deleted.

Incidentally, how many null codes to initially place and how many null codes to delete when relaying control data depends on the transmission delay time, the number of terminal nodes, the transmission speed of the serial interface, and the length of the null codes. This is represented as follows, where $\Delta t$ is the transmission delay time, n is the number of terminal nodes, s is the transmission speed (bps) of the serial interface, l (bit) is the length of a null code, j is the number of null codes to be initially placed, and k is the number of null codes to be deleted when control data is relayed.

$$j \geq (n-1) \times \Delta t \times s/l \qquad (7)$$

$$k = \Delta t \times s/l \qquad (8)$$

FIG. 16 shows, in time-series, data transmitted between the master node 10 and the terminal nodes 11 to 13 in the third embodiment, and is equivalent to FIG. 7 in the first embodiment and FIG. 13 in the second embodiment. Different from FIGS. 7 and 13, the end code arrives at the same timing to the terminal nodes, as a result of null codes of a number equivalent to $\Delta t$ being deleted whenever control data is relayed. Accordingly, the operation timing coincides, and the video frame cycles of the terminal nodes are synchronized, without designating to the terminal nodes a time for delaying the operation timing of the start of image sensing.

FIG. 17 is a flowchart showing an operation flow of the master node 10 in the third embodiment of the present invention, and is equivalent to FIG. 8 in the first embodiment. Steps S100 to S105 and S107 to S110 in FIG. 17 are the same as the description in FIG. 8. In step S111, the master node 10 generates data containing image sensing command fields (commands 1-3) with the values decided at step S105 as the parameter code. Then, at step S112, the master node 10 inserts a prescribed number (calculated by equation 7) of null codes after the image sensing parameter code and before the end code, and transmits, as control data, the data with the null codes inserted therein.

Figure 18:
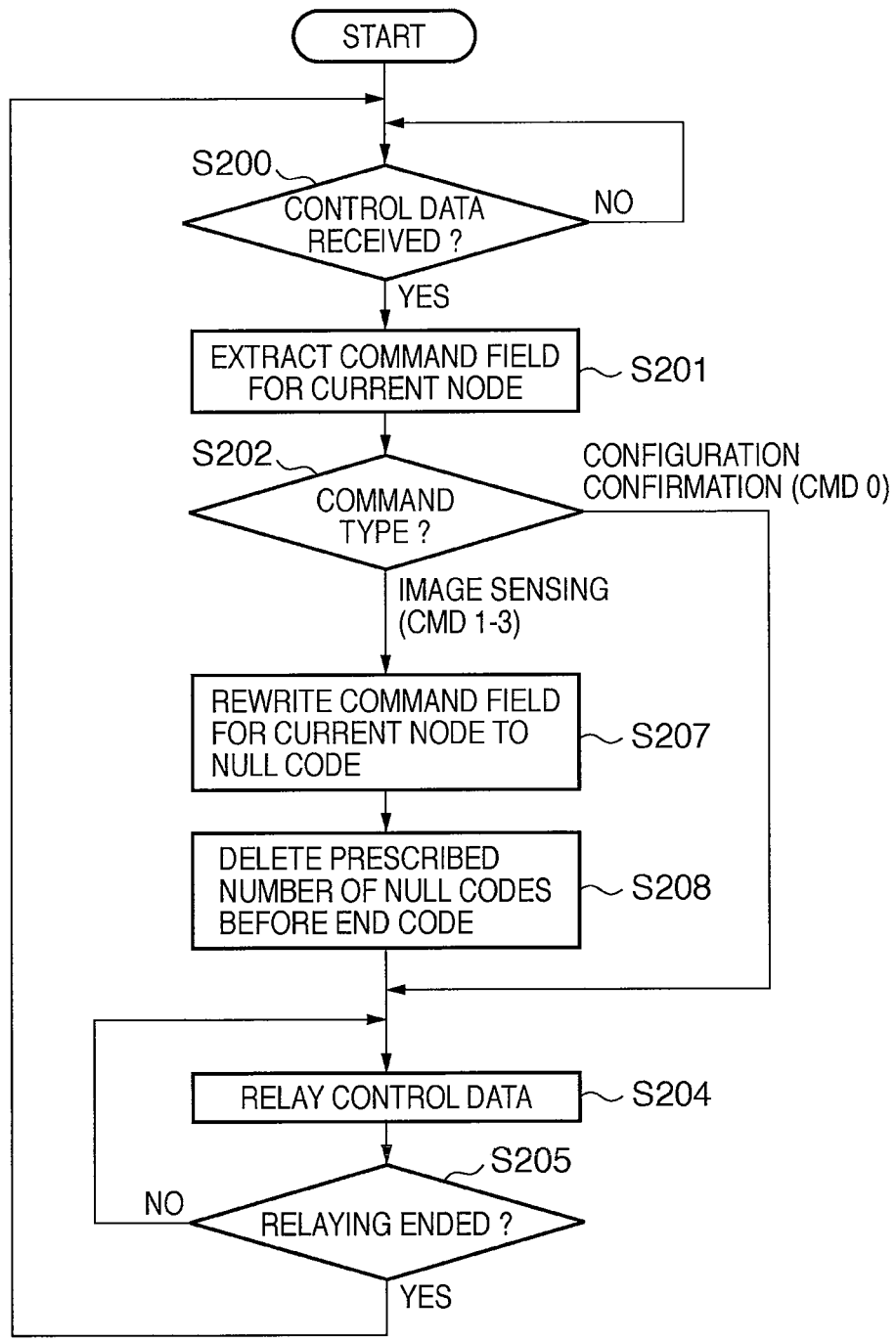
FIG. 18 is a flowchart showing an operation flow related to relaying of control data by a terminal node.

FIG. 18 is a flowchart showing an operation flow related to relaying of control data by a terminal node in the third embodiment of the present invention, and is equivalent to FIG. 9 in the first embodiment and FIG. 14 in the second embodiment. Steps S200 to S202, S204 to S205, and S207 in FIG. 18 are the same as the description in FIG. 14. In FIG. 18, step S208 has been added to FIG. 14. In the processing shown in FIG. 18, the terminal node deletes only a prescribed number (calculated by equation 8) of null codes positioned after the image sensing parameter code and before the end code, after rewriting the command field for that node to a null code at step S207.

The present embodiment as described above enables the frame cycles of video captured by the terminal nodes to be synchronized with only the relaying process, without designating delay times for delaying the operation timing of the start of image sensing by a prescribed time.

Fourth Embodiment

In the foregoing embodiment, each terminal node transmits the video data of that node, before relaying transmission data received from the downstream node, although the effect sought by the present invention can be obtained by transmitting the video data of that node after firstly relaying transmission data received from the downstream node.

Figure 19:
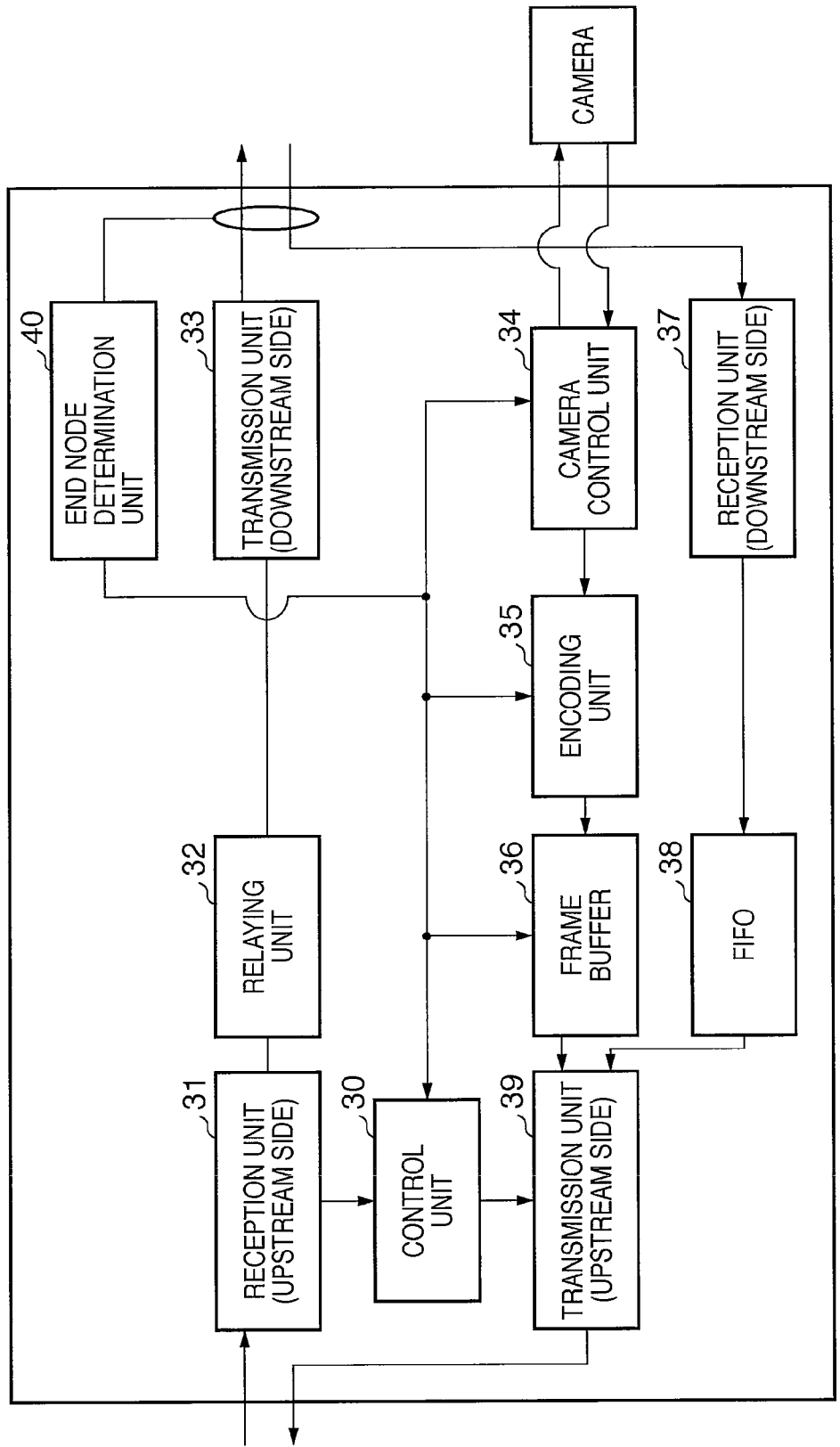
FIG. 19 is a block diagram showing a detailed configuration of a terminal node.

In this case, the terminal nodes require additional constituent elements. FIG. 19 is a block diagram showing a detailed configuration of a terminal node in the fourth embodiment of the present invention. In the configuration shown in FIG. 19, an end node determination unit 40 is added to the configuration (30-39) illustrated in FIG. 3. The other constituent elements are similar to the configuration of the network system according to the first embodiment.

The end node determination unit 40 is a block that uses a mechanical switch, a photointerrupter or the like to detect the mounting of an interface cable on the downstream side, and determines whether the terminal node is the end node based on the detection result. That is, the end node determination unit 40 determines that the terminal node is the end node if an interface cable is not mounted on the downstream side. Apart from using a mechanical switch or the like, the mounting of an interface cable may be determined by the change in an electrical characteristic such as impedance. The end node may also be determined by the activity/inactivity of the serial interface using voltage or the like, rather than determining whether an interface cable is mounted.

Figure 20:
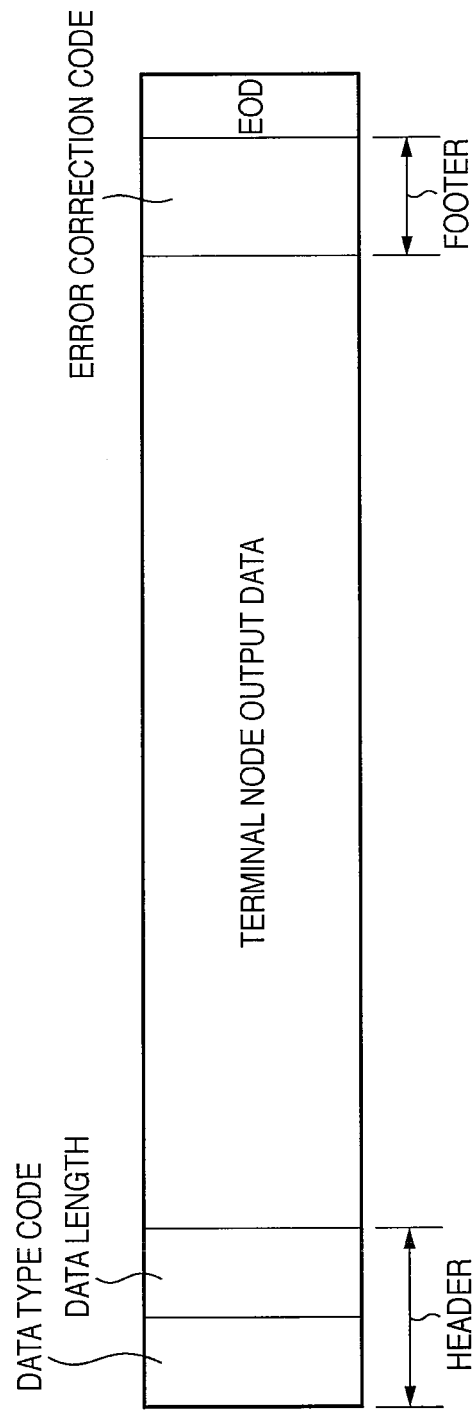
FIG. 20 shows the format of transmission data transmitted from a terminal node to an upstream node.

FIG. 20 shows the format of transmission data transmitted from a terminal node to an upstream node in the fourth embodiment of the present invention, and is equivalent to FIG. 4C in the first embodiment. A difference from FIG. 4C lies in the fact that an end-of-data (EOD) code has been added to the end of the data. Each terminal node transmits the EOD code following the footer when transmitting the output data of that node.

Figure 21:
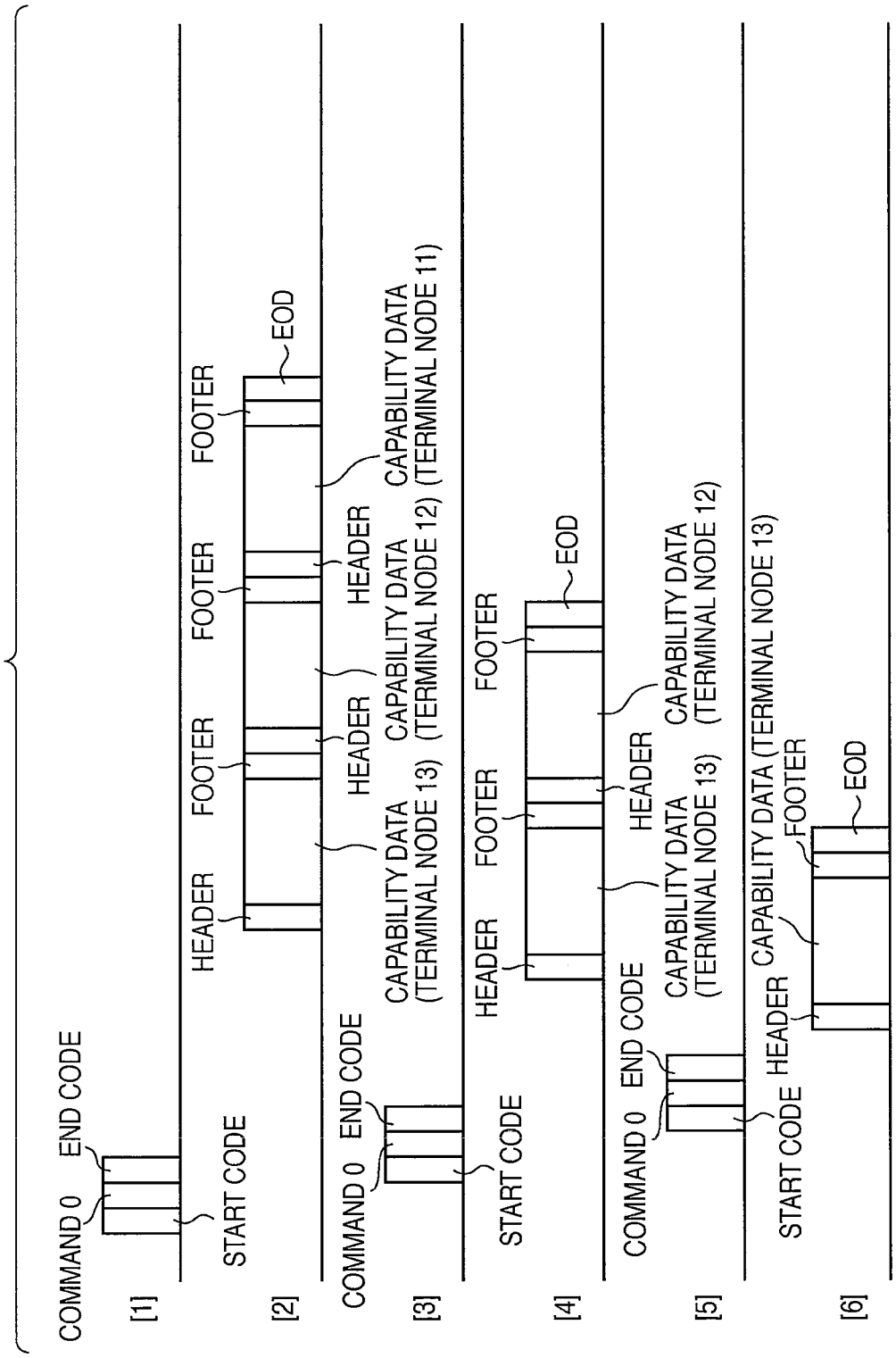
FIG. 21 shows, in time-series, data transmitted between the master node and terminal nodes.

FIG. 21 shows, in time-series, data transmitted between the master node 10 and the terminal nodes 11 to 13 when configuration confirmation is performed in the fourth embodiment. Each terminal node generates capability data after receiving the end code, and, if the end node, transmits the capability data immediately. Terminal nodes other than the end node firstly relay the transmission data received from the downstream node, and then transmit the generated capability data once the relaying of transmission data has ended.

Whether the relaying of transmission data has ended can be determined by whether the EOD code has appeared in the relayed transmission data. Note that the EOD code itself is either deleted and not relayed, or relayed after being rewritten to a null code. Subsequently, each terminal node transmits the capability data of that node after adding an EOD code to the end thereof. Performing these operations in each terminal node results in the capability data of the terminal nodes 13, 12 and 11 being transmitted in the stated order ([2] in FIG. 21).

Figure 22:
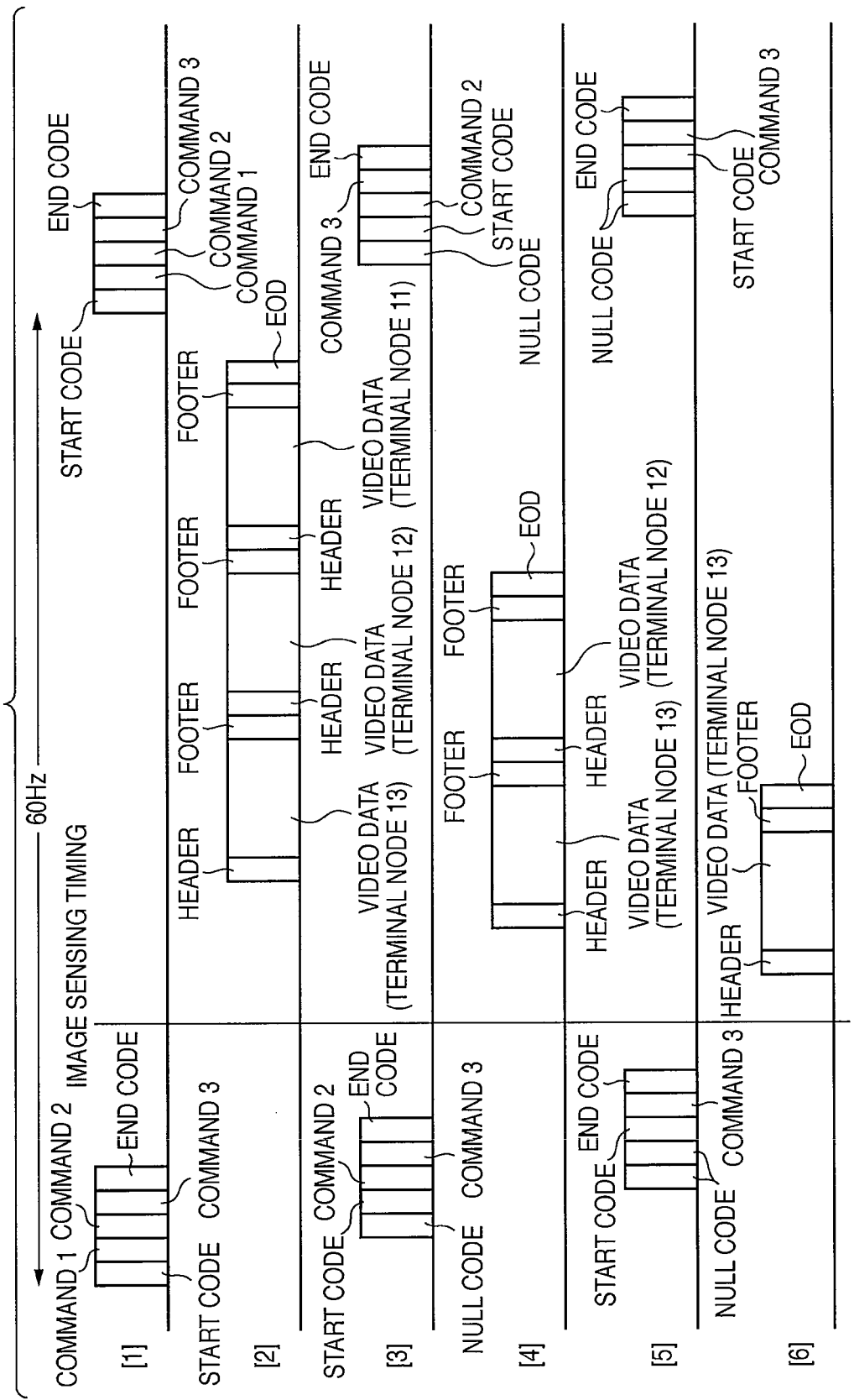
FIG. 22 shows, in time-series, data transmitted between the master node and terminal nodes.

FIG. 22 shows, in time-series, data transmitted between the master node 10 and the terminal nodes 11 to 13 when transmitting captured video data. Each terminal node performs image sensing and generates video data after receiving the end code, and, if the end node, immediately transmits the video. Terminal nodes other than the end node relay transmission data received from the downstream node, and then transmit the generated video data once the relaying of transmission data has ended. Note that the operations related to the EOD code are similar to the operations illustrated in FIG. 21. Performing these operations in each terminal node results in the video data of the terminal nodes 13, 12 to 11 being transmitted to the master node 10 in the stated order ([2] in FIG. 22).

Incidentally, even if, in the above operations, data the same as the EOD code appears in the capability data or video data, this data will not be determined to be EOD data. Whether the data being focused on is included in capability data or video data can be easily determined by utilizing the data length in the header. Alternatively, an appropriate bit string conversion process (e.g., mBnB conversion, where m<n) may be performed on the capability data or the video data so as to ensure that data the same as the EOD code (or null code) does not exist in the capability data or the video data. Further, the bit string format of the capability data can be devised so as to ensure that data the same as the EOD code (or null code) does not exist.

Figure 23:
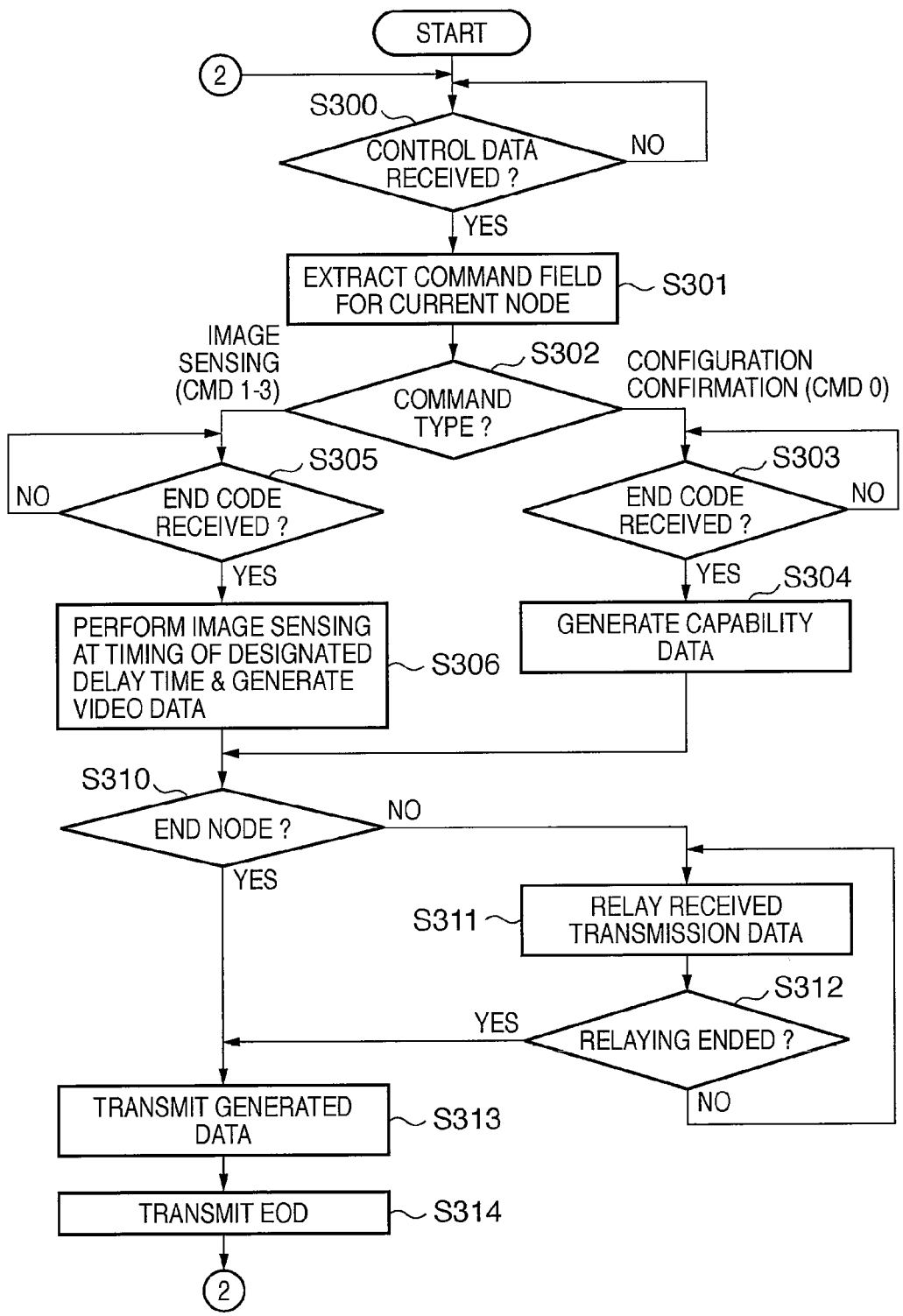
FIG. 23 is a flowchart showing an operation flow related to processing by a terminal node to transmit the output data of that node and relay transmission data received from a downstream node.

FIG. 23 is a flowchart showing an operation flow related to processing by a terminal node to transmit the output data of that node and relay transmission data received from a downstream node, and is equivalent to FIG. 10 in the first embodiment. Steps S300 to S306 in FIG. 23 are the same as the processing illustrated in FIG. 10. In step S310, the terminal node determines whether that node is the end node. If the end node, the terminal node, in step S313, transmits the output data generated at step S304 or step S306 to the upstream node. Then, in step S314, the terminal node transmits the EOD code following the output data.

On the other hand, if it is determined in step S310 not to be the end node, the terminal node, in step S311, relays all transmission data received from the downstream node to the upstream node. In the next step S312, the terminal node determines whether the relaying has ended. The terminal node repeatedly executes the processing of step S311 until the relaying has ended, and the processing moves to step S313 once the relaying has ended.

Whether the relaying of all of the transmission data has ended can be determined by whether the EOD code has appeared in the relayed transmission data. Note that the EOD code itself is either deleted and not relayed, or relayed after being rewritten to a null code. The processing from step S313 is executed once the relaying of transmission data has ended. The processing of steps S300 to S314 shown above is repeatedly executed.

As described above, the present invention can be implemented even with a configuration in which the output data of the current node is transmitted after firstly relaying transmission data received from the downstream node.

The foregoing embodiments enable a network system to be realized that utilizes simple communication protocols with a low processing load that are commonly used for configuration confirmation and for data transmission of video data and the like, which is a primary function of the system. Moreover, the network system of the present embodiment does not require transfer timeslots to be designated for each terminal node when performing data transmission. Accordingly, setting of individual identification information, address identification codes or the like is completely unnecessary.

The foregoing embodiments enable a network system to be realized that is able to synchronize, with high precision, the frame cycles of video from the terminal nodes.

As described above, a plurality of communication apparatuses (terminal nodes) and a communication control apparatus (master node) are daisy chained. The communication control apparatus transmits control data to the plurality of communication apparatuses, and the plurality of communication apparatuses receive the transmitted data.

Each communication apparatus receives, in synchronous with receipt of the control data, data from another communication apparatus on a different side from a communication control apparatus side (a second communication apparatus daisy chained on one side of the communication apparatus). The communication apparatus transmits, in synchronous with receipt of the control data, data to one of the communication control apparatus and another communication apparatus on the communication control apparatus side (a first communication apparatus daisy chained on the other side of the communication apparatus), and following the transmission, transmits the received data to the one of the communication control apparatus and the other communication apparatus on the communication control apparatus side.

The communication apparatus transmits the received control data to the other communication apparatus on the different side from the communication control apparatus side. The communication apparatus transmits the control data after deleting or rewriting to an invalid code, control data addressed to the communication apparatus. The control data includes a delay time adjustment code, and the communication apparatus transmits the control data after changing the delay time adjustment code.

The communication control apparatus confirms the configuration of the communication system, generates operation delay information for each communication apparatus in accordance with the confirmation result, and transmits the control data with the operation delay information included therein.

The communication apparatus determines whether the communication apparatus is positioned at the end of the daisy chain, and switches, according to the determination result, between transmitting data to the communication control apparatus side or transmitting data of the communication apparatus after relaying data received from the other communication apparatus on the different side from the communication control apparatus side to the communication control apparatus side, in response to receipt of the control data.

The above configuration enables data transfer to be performed efficiently with a simple configuration.

The object of the present invention is also attained by supplying a storage medium storing the program code of software for realizing the functions of the foregoing embodiments to a system or an apparatus, and reading out from the storage medium and executing the program code with a computer of the system or apparatus.

In this case, the actual program code read out from the storage medium realizes the functions of the foregoing embodiments, and the actual program code and the storage medium storing the program code constitute the present invention.

Storage media that can be used for supplying the program code include, for example, flexible disk, hard disk, optical disk, magneto-optical disk, CD-ROM, CD-R, magnetic tape, nonvolatile memory card, and ROM.

The present invention also covers the case where an operating system or the like running on the computer performs part or all of the actual processing based on instructions in the program code read out by the computer, with the functions of the foregoing embodiments being realized by this processing.

Further, the present invention also covers the case where the program code read out from the storage medium is written to a memory provided in a function expansion unit or the like connected to the computer, and a CPU or the like performs the actual processing based on instructions in the program code, with the functions of the foregoing embodiments being realized by this processing.

Further, a configuration in which the program code is supplied to the computer via a communication medium such as the Internet is also included in the scope of the present invention.

The present invention enables data transfer to be performed efficiently with a simple configuration.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-181324, filed on Jul. 10, 2007, which is hereby incorporated by reference herein in its entirety.

What is claimed is:

1. A communication system in which a plurality of communication apparatuses and a communication control apparatus provided in a daisy chain configuration, and each communication apparatus relays data from one side of the communication system to another side, wherein
   the communication control apparatus comprises:
      a transmission unit to transmit, to the plurality of communication apparatuses, a command message comprising a plurality of command fields, each of the command fields having a command code and a parameter code, each of said command codes including respective operation delay information for each communication apparatus; and
      a reception unit to receive communication data transmitted by the plurality of communication apparatuses, and
   each communication apparatus comprises:
      a command reception unit to receive the command message from an upstream side of the daisy chain configuration;
      a communication data generation unit to generate communication data at a timing being based on the operation delay information included in the received command message;
      a command transmission unit to transmit the received command message to a downstream side of the daisy chain configuration;
      a communication data reception unit to receive communication data generated by another communication apparatus from the downstream side; and a communication data transmission unit to sequentially transmit, to the upstream side, communication data generated by the communication data generation unit and the communication data received by the communication data reception unit;

each of the communication apparatuses further comprises a command data extraction unit to extract a command code and a parameter code contained in a first one of the command fields in the received command message sent by the communication control apparatus, the first one of the command fields being located within the command message immediately prior to subsequent command fields, each of the command codes identifying a respective command to be performed by a respective one of the communication apparatuses, each of the parameter codes defining a respective parameter directly relating to the respective command code;

each of the communication apparatuses, upon processing the command identified by the respective extracted command code, deletes or changes to an invalid code said command code within the respective command field of the command message, prior to transmitting the command message to the next communication apparatus in the daisy chain configuration.

2. The communication system according to claim 1, wherein the operation delay information for each communication apparatus is designated according to the number of communication apparatuses in the daisy chain configuration.

3. A communication system in which a plurality of communication apparatuses and a communication control apparatus provided in a daisy chain configuration, and each communication apparatus relays data from one side of the communication system to another side, wherein the communication control apparatus comprises:
 a transmission unit to transmit, to the plurality of communication apparatuses, a command message comprising a plurality of command fields, each of the command fields having a command code and a parameter code, each of said command codes including respective operation delay information for each communication apparatus; and
 a reception unit to receive communication data transmitted by the plurality of communication apparatuses, and each communication apparatus comprises:
 a determination unit to determine whether the respective communication apparatus is positioned at an end of the daisy chain configuration;
 a command reception unit to receive the command message from an upstream side of the daisy chain configuration;
 a communication data generation unit to generate communication data at a timing being based on the operation delay information included in the received command message;
 a command transmission unit to transmit the received command message to a downstream side of daisy chain configuration;
 a communication data reception unit to receive communication data generated by another communication apparatus from the downstream side; and
 a communication data transmission unit to transmit, to the upstream side, communication data generated by the communication data generation unit, if the communication apparatus is determined to be the communication apparatus positioned at the end of the daisy chain configuration by the determination unit, and wherein the communication data transmission unit sequentially transmits, to the upstream side, the communication data received by the communication data reception unit and then transmits, to the upstream side, the communication data generated by the communication data generation unit, if the communication apparatus is not determined to be the communication apparatus positioned at the end of the daisy chain configuration by the determination unit, each of the communication apparatuses further comprises a command data extraction unit to extract a command code and a parameter code contained in a first one of the command fields in the received command message sent by the communication control apparatus, the first one of the command fields being located within the command message immediately prior to subsequent command fields, each of the command codes identifying a respective command to be performed by a respective one of the communication apparatuses, each of the parameter codes defining a respective parameter directly relating to the respective command code;

each of the communication apparatuses, upon processing the command identified by the respective extracted command code, deletes or changes to an invalid code said command code within the respective command field of the command message, prior to transmitting the command message to the next communication apparatus in the daisy chain configuration.

4. A communication apparatus provided in a daisy chain configuration with other communication apparatuses, the communication apparatus relaying data from one side of the daisy chain configuration to another side, comprising:
 a command reception unit to receive a command message including operation delay information from an upstream side of the daisy chain configuration;
 a communication data generation unit to generate communication data at a timing being based on the operation delay information included in the received command message;
 a command transmission unit to transmit the received command message to a downstream side of the daisy chain configuration;
 a communication data reception unit to receive communication data generated by another communication apparatus from the downstream side;
 a communication data transmission unit to sequentially transmit, to the upstream side, communication data generated by the communication data generation unit and the communication data received by the communication data reception unit;
 a command data extraction unit to extract a command code and a parameter code contained in a first one of command fields in the received command message sent by a communication control apparatus, the first one of the command fields being located within the command message immediately prior to subsequent command fields, each of the command codes identifying a respective command to be performed by a respective communication apparatus, each of the parameter codes defining a respective parameter directly relating to the respective command code;

the communication apparatus, upon processing the command identified by the respective extracted command code, deletes or changes to an invalid code said command code within the respective command field of the command message, prior to transmitting the command message to the next communication apparatus in the daisy chain configuration.

5. A communication apparatus provided in a daisy chain configuration with other communication apparatuses, the communication apparatus relaying data from one side of the daisy chain configuration to another side, comprising:
- a determination unit to determine whether the communication apparatus is positioned at an end of the daisy chain configuration;
- a command reception unit to receive a command message including operation delay information from an upstream side of the daisy chain configuration;
- a communication data generation unit to generate communication data at a timing being based on the operation delay information included in the received command message;
- a command transmission unit to transmit the received command message to a downstream side of the daisy chain configuration;
- a communication data reception unit to receive communication data generated by another communication apparatus from the downstream side; and
- a communication data transmission unit to transmit, to the upstream side, communication data generated by the communication data generation unit, if the communication apparatus is determined to be the communication apparatus positioned at the end of the daisy chain configuration by the determination unit, and
- wherein the communication data transmission unit sequentially, transmits to the upstream side, the communication data received by the communication data reception unit and then transmits, to the upstream side, the communication data generated by the communication data generation unit, if the communication apparatus is not determined to be the communication apparatus positioned at the end of the daisy chain configuration by the determination unit,
- the communication apparatus further comprises a command data extraction unit to extract a command code and a parameter code contained in a first one of command fields in the received command message sent by a communication control apparatus, the first one of the command fields being located within the command message immediately prior to subsequent command fields, each of the command codes identifying a respective command to be performed by a respective communication apparatus, each of the parameter codes defining a respective parameter directly relating to the respective command code;
- the communication apparatus, upon processing the command identified by the respective extracted command code, deletes or changes to an invalid code said command code within the respective command field of the command message, prior to transmitting the command message to the next communication apparatus in the daisy chain configuration.

6. A communication method of a communication system in which a plurality of communication apparatuses and a communication control apparatus provided in a daisy chain configuration, and each communication apparatus relays data from one side of the communication system to another side, comprising:
- a command reception step, in each communication apparatus, of receiving from an upstream side of the daisy chain configuration, a command message comprising a plurality of command fields, each of the command fields having a command code and a parameter code, each of said command codes including respective operation delay information;
- a communication data generation step, in each communication apparatus, of generating communication data at a timing being based on the operation delay information included in the received command message;
- a command transmission step, in each communication apparatus, of transmitting the received command message to a downstream side of the daisy chain configuration;
- a communication data receiving step, in each communication apparatus, of receiving communication data generated by another communication apparatus from the downstream side;
- a communication data transmitting step, in each communication apparatus, of sequentially transmitting, to the upstream side, communication data generated at the communication data generation step and the communication data received at the communication data reception step;
- a command data extraction step, in each communication apparatus, of extracting a command code and a parameter code contained in a first one of the command fields in the received command message, the first one of the command fields being located within the command message immediately prior to subsequent command fields, each of the command codes identifying a respective command to be performed by a respective one of the communication apparatuses, each of the parameter codes defining a respective parameter directly relating to the respective command code;
- a command code change step, in each communication apparatus, of deleting or changing to an invalid code the command code within the respective command field of the command message, upon processing the command identified by the respective extracted command code and prior to transmitting the command message to the next communication apparatus in the daisy chain configuration.

7. A communication method of a communication system in which a plurality of communication apparatuses and a communication control apparatus provided in a daisy chain configuration, and each communication apparatus relays data from one side of the communication system to another side, comprising:
- a determining step, in each communication apparatus, of determining whether the communication apparatus is positioned at an end of the daisy chain configuration;
- a command reception step, in each communication apparatus, of receiving from an upstream side of the daisy chain configuration, a command message comprising a plurality of command fields, each of the command fields having a command code and a parameter code, each of said command codes including respective operation delay information;
- a communication data generation step, in each communication apparatus, of generating communication data at a timing being based on the operation delay information included in the received command message;
- a command transmission step, in each communication apparatus, of transmitting the received command message to a downstream side of the daisy chain configuration;

a communication data reception step, in each communication apparatus, of receiving communication data generated by another communication apparatus from the downstream side;

a communication data transmitting step, in each communication apparatus, of transmitting, to the upstream side, communication data generated at the communication data generation step, if the communication apparatus is determined to be the communication apparatus positioned at the end of the daisy chain configuration at the determination step, and of sequentially transmitting, to the upstream side, the communication data received at the communication data reception step and then transmitting, to the upstream side, the communication data generated at the communication data generation step, if the communication apparatus is not determined to be the communication apparatus positioned at the end of the daisy chain configuration at the determination step;

a command data extraction step, in each communication apparatus, of extracting a command code and a parameter code contained in a first one of the command fields in the received command message, the first one of the command fields being located within the command message immediately prior to subsequent command fields, each of the command codes identifying a respective command to be performed by a respective one of the communication apparatuses, each of the parameter codes defining a respective parameter directly relating to the respective command code;

a command code change step, in each communication apparatus, of deleting or changing to an invalid code the command code within the respective command field of the command message, upon processing the command identified by the respective extracted command code and prior to transmitting the command message to the next communication apparatus in the daisy chain configuration.

8. A non-transitory computer-readable storage medium storing a computer program for causing a computer to execute the communication method claimed in claim 6.

9. A non-transitory computer-readable storage medium storing a computer program for causing a computer to execute the communication method claimed in claim 7.

* * * * *